(12) United States Patent
Norkin et al.

(10) Patent No.: US 10,834,427 B2
(45) Date of Patent: Nov. 10, 2020

(54) DEBLOCKING FILTERING

(71) Applicant: VELOS MEDIA, LLC, Plano, TX (US)

(72) Inventors: Andrey Norkin, Solna (SE); Kenneth Andersson, Gävle (SE); Rickard Sjöberg, Stockholm (SE)

(73) Assignee: Velos Media, LLC, Dallas, TX (US)

( * ) Notice: Subject to any disclaimer, the term of this patent is extended or adjusted under 35 U.S.C. 154(b) by 0 days.

(21) Appl. No.: 15/921,328

(22) Filed: Mar. 14, 2018

(65) Prior Publication Data
US 2018/0205970 A1 Jul. 19, 2018

Related U.S. Application Data

(63) Continuation of application No. 15/208,389, filed on Jul. 12, 2016, now Pat. No. 9,942,574, which is a
(Continued)

(51) Int. Cl.
*H04N 19/86* (2014.01)
*H04N 19/176* (2014.01)
(Continued)

(52) U.S. Cl.
CPC ............ *H04N 19/86* (2014.11); *H04L 43/16* (2013.01); *H04N 19/117* (2014.11);
(Continued)

(58) Field of Classification Search
CPC ... H04N 19/00909; H04N 19/86; H04N 19/80
See application file for complete search history.

(56) References Cited

U.S. PATENT DOCUMENTS

| | | |
|---|---|---|
| 6,028,967 A | 2/2000 | Kim et al. |
| 2005/0243911 A1 | 11/2005 | Kwon et al. |

(Continued)

FOREIGN PATENT DOCUMENTS

| | | |
|---|---|---|
| EP | 1657933 A1 | 5/2006 |
| JP | 2011114683 A | 6/2011 |

(Continued)

OTHER PUBLICATIONS

An, Jicheng, "TEIO Subtestl: Improved Deblocking Filter", Joint Collaborative Team on Video Coding, of ITU-T SG16 WP3 and ISO/IEC JTC1/SC29/WG11, 3rd Meeting, Guangzhou, CN, Oct. 7-15, 2010, 1-8.

(Continued)

*Primary Examiner* — Michael J Hess
(74) *Attorney, Agent, or Firm* — Spencer C. Patterson; Grable Martin Fulton PLLC

(57) ABSTRACT

A method of reducing blocking artifacts associated with pixels of a block boundary of an image. Pixel values of pixels from a first block and a neighboring block, being located on opposite sides of a block boundary, are evaluated. A first offset for the two pixels of each block located next to the block boundary is calculated, after which the first offset is compared to a first threshold value. If abs[first offset]<first threshold, the pixel values of consecutive pixels from the first block and the pixel values of consecutive pixels from the second block are modified by applying normal filtering on the respective pixels, while if instead abs[first offset] >=first threshold, the pixel values of consecutive pixels from the first block and the pixel values of consecutive pixels from the second block are modified by applying weak filtering or no filtering at all on the respective pixels.

21 Claims, 9 Drawing Sheets

Related U.S. Application Data continuation of application No. 13/979,006, filed as application No. PCT/SE2012/050027 on Jan. 13, 2012, now Pat. No. 9,414,066.

(60) Provisional application No. 61/432,746, filed on Jan. 14, 2011, provisional application No. 61/448,296, filed on Mar. 2, 2011.

(51) Int. Cl.
*H04N 19/117* (2014.01)
*H04N 19/14* (2014.01)
*H04N 19/124* (2014.01)
*H04L 12/26* (2006.01)
*H04N 19/182* (2014.01)

(52) U.S. Cl.
CPC ........... *H04N 19/124* (2014.11); *H04N 19/14* (2014.11); *H04N 19/176* (2014.11); *H04N 19/182* (2014.11)

(56) References Cited

U.S. PATENT DOCUMENTS

| | | |
|---|---|---|
| 2006/0008038 A1 | 1/2006 | Song et al. |
| 2006/0078048 A1 | 4/2006 | Bjontegaard |
| 2006/0274959 A1 | 12/2006 | Piastowski |
| 2007/0122053 A1 | 5/2007 | Kim et al. |
| 2008/0117980 A1 | 5/2008 | Hung et al. |
| 2008/0123750 A1 | 5/2008 | Bronstein et al. |
| 2009/0161794 A1 | 6/2009 | Gordon et al. |
| 2010/0316139 A1 | 12/2010 | Le Leannec et al. |

FOREIGN PATENT DOCUMENTS

| | | |
|---|---|---|
| JP | 2013540395 A | 10/2013 |
| JP | 05540163 B2 | 7/2014 |
| WO | 02/096117 A1 | 11/2002 |
| WO | 2010031868 A1 | 3/2010 |
| WO | 2011096869 A1 | 8/2011 |

OTHER PUBLICATIONS

Hsu, C.L. et al., "A Fast-Deblocking Boundary-strength Based Architecture Design of Deblocking Filter in H.264/AVC Applications", Journal of Signal Processing Systems, vol. 52, Issue 3, Springer US, Sep. 1, 2008, pp. 211-229.

List, Peter et al., "Adaptive Deblocking Filter", IEEE Transactions on Circuits and Systems for Video Technology, vol. 13, Issue 7, Jul. 2003, 614-619.

Norkin, Andrey et al., "CE12.1: Ericsson deblocking filter", Joint Collaborative Team on Video Coding (JCT-VC) of ITU-T SG16 WP3 and ISO/IEC JTC1/SC29/WG11, 5th meeting, Geneva, Mar. 16-23, 2011, 1-6.

Shin, Seung-Ho et al., "Variable Block-Based Deblocking Filter for H.264/AVC on Low-End and Low-Bit Rates Terminals", Signal Processing: Image Communication, vol. 25, Issue 4, pp. 255-267, Apr. 2010.

Ugur, Kemal et al., "Appendix to Description of video coding technology proposal by Tandberg Nokia Ericsson", Joint Collaborative Team on Video Coding (JCT-VC) of ITU-T SG16 WP3 and ISO/IEC JTC1/SC29/WG11, Dresden, DE, Apr. 15-23, 2010, 1-55.

Unknown, Author, "Test Model under Consideration", Joint Collaborative Team on Video Coding, of ITU-T SG16 WP3 and ISO/IEC JTC1/SC29/WG11, 2nd Meeting: Geneva, CH, Jul. 21-28, 2010, 1-191.

Xiong, Zhiwei et al., "TE10, Subset 1: Report of Content-Adaptive Deblocking", Joint Collaborative Team on Video Coding of ITU-T SG16 WP3 and ISO/IEC JTC1/SC29/WGlt, 3rd Meeting: Guangzhou, CN, Oct. 7-15, 2010, 1-9.

Kim, Sung Deuk, et al., "A Deblocking Filter with Two Separate Modes in Block-Based Video Coding", IEEE Transactions on Circuits and Systems for Video Technology, vol. 9, No. 1, Feb. 1999, pp. 156-160.

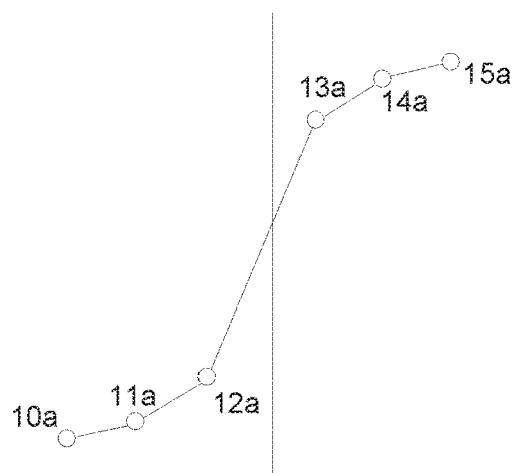
Figure 1a
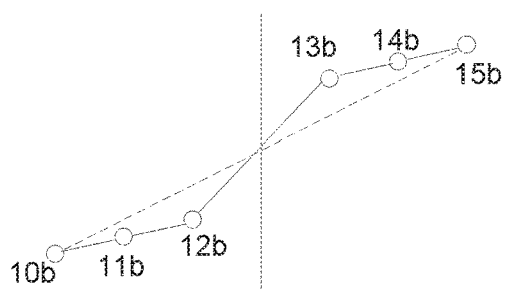
Figure 1b
Figure 2a

DEBLOCKING FILTERING

RELATED APPLICATIONS

This application is a continuation of U.S. patent application Ser. No. 15/208,389, filed 12 Jul. 2016, which is a continuation of U.S. patent application Ser. No. 13/979,006, filed 9 Aug. 2016 and issued as U.S. Pat. No. 9,414,066, which was a national stage entry of international patent application serial number PCT/SE2012/050027, filed 13 Jan. 2012, which claimed the benefit of provisional application Ser. No. 61/432,746, filed 14 Jan. 2011 and provisional application Ser. No. 61/448,296, filed 2 Mar. 2011. The entire contents of each of the foregoing applications is incorporated herein by reference.

TECHNICAL FIELD

The present document relates to deblocking filtering for reducing blocking artifacts at block boundaries.

BACKGROUND

Deblocking filters are used in the video coding standards in order to combat blocking artifacts. The blocking artifacts arise because the original video is split into blocks which are processed relatively independently. The blocking artifacts can arise due to different intra predictions of blocks, quantization effects and motion compensation. Two particular variants of deblocking are described below.

1) H.264 Deblocking:

In state of the art video coding, such as H.264, there is an adaptive deblocking filter, also denoted loop filter, after prediction and residual reconstruction, but before storage of the reconstruction for later reference when encoding or decoding subsequent frames. The deblocking filtering consists of several steps, such as filter decisions, filtering operations, a clipping function and changes of pixel values. The decision whether or not to filter a border is made based on evaluation of several conditions. Filter decisions typically depend on macroblock (MB) type, motion vector (MV) difference between neighboring blocks, whether neighboring blocks have coded residuals and on the local structure of the current and/or neighboring blocks.

The amount of filtering for a pixel depends, among others, on the position of that pixel relative to the block border, or block boundary, and on the quantization parameter (QP) value used for residual coding.

The filter decision is based on comparing three pixel differences with three thresholds. The thresholds are adapted to the quantization parameter (QP) value. For instance, assume a vertical block boundary of:

a b c d|e f g h where a, b c and d denote the pixel values of the pixels of a row of pixels in a current block with e, f, g and h denoting the corresponding pixel values of the pixels of a corresponding row of pixels in a neighboring block. If the following conditions are fulfilled the filter decision is positive. e.g., $abs(d-e)<thr1$, $abs(c-d)<thr2$, and $abs(e-f)<thr2$, where thr1 and thr2 are adapted based on QP. A horizontal block boundary can be handled in a corresponding way.

There are two filtering modes in H.264. In the first filtering mode, referred to as normal filtering, filtering can be described with a delta value with which filtering changes the current value. The filtering for the pixels closest to the block boundary is:

$d'=d+delta$ and $e'=e-delta$, where delta has been clipped off to a threshold thr3 to a value that is constrained by the QP. More filtering is thereby allowed for high QP than for low QP.

Clipping can be described as:

delta_clipped=max(−thr3,min(thr3,delta)), where thr3>=0.

where thr3 is controlling the filter strength. A larger value of thr3 means that the filtering is stronger, which means that a stronger low-pass filtering effect will occur.

The filter strength can be increased if any of the following two conditions also holds, e.g., $abs(b-d)<thr2$ and $abs(e-g)<thr2$. The filter strength is adapted by clipping the delta less. e.g., by allowing for more variation.

The second filtering mode, referred to as strong filtering, is applied for intra macroblock boundaries only, when the following condition is fulfilled:

$abs(d-e)<thr¼$.

For more information of deblocking filtering in H.264 reference is made to List et al., Adaptive Deblocking Filter, *IEEE Transactions on Circuits and Systems for Video Technmology*, vol. 13, no. 7, July 2003.

2) HEVC Deblocking:

As is well-known in the art, a video frame is divided into non-overlapping blocks of pixels that are encoded and decoded according to various available intra and inter coding modes.

Generally, a video frame is divided into non-overlapping macroblocks of 16×16 pixels. Such a macroblock can in turn be divided into smaller blocks of different sizes, such as 4×4 or 8×8 pixels. However, the described method may be applied also to rectangular blocks, arranged e.g., as 4×8, 8×4, 8×16 or 16×8 pixels. The embodiments can be applied to any such block of pixels, including macroblocks or even larger blocks of pixels.

In the emerging High Efficiency Video Coding (HEVC) standard, coding units (CU), prediction units (PU) and transform units (TU) are used. The prediction units are defined inside a coding unit and contain the intra or inter prediction modes. Transform units are defined inside a coding unit where the largest transform size is 32×32 pixels and the smallest size is 4×4 pixels. The CU size is currently varying from 64×64 pixels (largest) to 8×8 pixels (smallest). In this way, the largest CU can be split into smaller CUs with the "level of granularity" depending on the local characteristics of the frame. This means that the largest CU may be split into smaller CUs of different sizes.

Large blocks, referred to as Largest Coding Units (LCU) in HEVC, are scanned left to right in the same way as normal macroblocks in H.264. Each LCU may be split into four smaller coding units (CU), and then may be split again hierarchically in a quad-tree fashion. There is also a smallest size for the Coding Unit defined, these blocks are called Smallest Coding Unit (SCU).

The CU has its prediction type (e.g., intra prediction or inter-prediction). The CU is also a root of two structures called prediction units and transform units. Each prediction unit inside the CU can have its own prediction that is different from the predictions of the other PU (for example, a separate motion vector or intra prediction direction). A CU can contain one PU (which has then the same size as the CU) or can be split further into up to four PUs. Those PUs can have either square or rectangular form (in this case, the vertical and horizontal PU dimensions differ). As an example, there might be a CU of size 16×16 that is split once, creating 4 8×8 prediction unit blocks (PUs). If the coding type of the CU is Intra, the PUs may have different Intra prediction modes. If the coding type of the CU is Inter, the PUs may have different motion vectors.

There is also a transform quad-tree that has the CU as its root. The resulting blocks are called Transform Units (TU). As an example, there might be a CU of size 16×16 that is split into 8×8 TUs. Then, one of the 8×8 TU can be split into 4×4 TUs. Then each TU is transformed with an 8×8 or a 4×4 transform. If the root TU was not split, then a 16×16 transform would have been used. Transforms can also have a non-square (rectangular) shape.

In the draft HEVC (High Efficiency Video Coding) specification "Test Model under Consideration", ITU-T SG16 WP3 document. JCTVC-B205. Chapter 6.5 In-loop filter process, the deblocking filter works differently from H.264. The filtering is performed if at least one of the blocks on the side of the boundary is intra, or has non-zero coefficients, or if the difference between the motion vector components of the blocks is greater than or equal to one integer pixel.

For example, if filtering the border between two blocks with a vertical block boundary of:

$$p3_i p2_i p1_i p0_i | q0_i q1_i q2_i q3_i$$

with $pj_i$ denoting the pixel value of pixel number j of row number i in the current block and $qj_i$ denoting the pixel value of pixel number j of row number i in the neighboring block, i=0 . . . 7, j=0 . . . 3, then the following condition should also be satisfied:

$$d=|p2_2-2\times p1_2+p0_2|+|q2_2-2\times q1_2+q0_2|+|p^2{}_5-2\times p1_5+p0_5|+|q2_5-2\times q1_5+q0_5|<\beta$$

where β depends on QP. In the above mentioned HEVC specification, there is a table of β, where β increases with QP.

If the given conditions are fulfilled and filtering is done between a current block and a neighboring block, one of two types of filtering, referred to as weak and strong filtering, respectively, is performed. The choice between the strong and the weak filtering is done separately for each line depending on the following conditions.

For each line i=0 . . . 7, the strong filtering is performed if all the following conditions are true, otherwise, weak filtering is performed:

$$d<(\beta>>2)$$

$$(|p3_i-p0_i|+|q0_i-q3_i|)<(\beta>>3)$$

$$|p0_i-q0_i|<((5\times t_C+1)>>1)$$

where $t_C$ and β depend on QP and >> denotes a right shift operator.

The two filtering modes, i.e., weak and strong filtering, mentioned in the HEVC specification mentioned above can be described as follows:

Weak Filtering:

Weak filtering is performed based on the conditions specified above. The actual filtering works by computing an offset, adding it to the original pixel value and clipping the sum to a filtered output pixel value in the range of 0-255:

$$\text{offset}=\text{Clip}(-t_C, t_C, (13\times(q0_i-p0_i)+4\times(q1_i-p1_i)-5\times(q2_i-p2_i)+16)>>5))$$

$$p0_i=\text{Clip}_{0\text{-}255}(p0_i+\text{offset})$$

$$q0_i=\text{Clip}_{0\text{-}255}(q0_i-\text{offset})$$

$$p1_i=\text{Clip}_{0\text{-}255}(p1_i+\text{offset}/2)$$

$$q1_i=\text{Clip}_{0\text{-}255}(q1_i-\text{offset}/2)$$

where the clip function Clip(A, B, x) is defined as Clip(A, B, x)=A if x<A, Clip(A, B, x)=B if x>B, Clip(A, B, x)=x if A<=x<=B, and $\text{Clip}_{0\text{-}255}(x)$ is defined as Clip(0, 255, x).

Strong Filtering:

The strong filtering mode is performed by the following set of operations:

$$p0_i=\text{Clip}_{0\text{-}255}((p2_i+2\times p1_i+2\times p0_i+2\times q0_i+q1_i+4)>>3)$$

$$q0_i=\text{Clip}_{0\text{-}255}((p1_i+2\times p0_i+2\times q0_i+2\times q1_i+q2_i+4)>>3)$$

$$p1_i=\text{Clip}_{0\text{-}255}((p2_i+p1_i+p0_i+q0_i+2)>>2)$$

$$q1_i=\text{Clip}_{0\text{-}255}((p0_i+q0_i+q1_i+q2_i+2)>>2)$$

$$p2_i=\text{Clip}_{0\text{-}255}((2\times p3_i+3\times p2_i+p1_i+p0_i+q0_i+4)>>3)$$

$$q2_i=\text{Clip}_{0\text{-}255}((p0_i+q0_i+q1_i+3\times q2_i+2\times q3_i+4)>>3)$$

In H.264 filtering, there is a check whether or not abs(q0-p0)<threshold(QP) is fulfilled, for the purpose deciding whether there is a blocking artefact at the block boundary or if it is a natural edge at the block boundary. However, such a check is not mentioned in the HEVC standard, probably due to the fact that the deblocking filtering is done also in case the signals remind of inclined ramps. Therefore, such a check cannot tell if one has to do with a natural edge or a part of a change in the ramp signal. As a consequence, natural edges are also filtered with the deblocking filter, although the amount of filtering is limited by a clipping value. It is therefore a need for an efficient blocking filter that can be used to reduce blocking artifacts at block boundaries but which does not have the above mentioned drawbacks.

SUMMARY

It is an object of the present document to address the deficiencies mentioned above. More specifically, a method and associated equipment is provided which allows pixel values of pixels located in close vicinity of a block boundary to selectively be modified or maintained unmodified depending on the relative difference between the considered pixel values. One advantage with applying the suggested approach is that the amount of filtering, resulting in modification of certain pixels, will be reduced in situations where the block boundary between two neighbouring blocks is considered to be a natural edge.

According to a first aspect a method of reducing blocking artifacts associated with consecutive pixels of a block boundary of an image, such as e.g., a video frame, is provided. As a prerequisite at least two consecutive pixels from a first block and at least two consecutive pixels from a second neighboring block are selected, where the blocks are located on opposite sides of a block boundary and where the pixels are forming a line of pixels which line is perpendicular to the block boundary. A first offset is then calculated for the two pixels of each block located next to the block boundary, after which the first offset is compared to a first threshold value. After such a comparison the respective pixel values of n consecutive pixels from the first block and the respective pixel values of m consecutive pixels from the neighboring block are modified, by applying normal filtering on these pixels, in case abs[first offset]<first threshold.

If instead abs[first offset]>=first threshold, the respective pixel values of j consecutive pixels from the first block and the respective pixel values of k consecutive pixels from the neighboring block are modified, by applying weak filtering or no filtering at all on these pixels, where n>0, m>0 n>=j, and m>=k.

According to one embodiment, the first offset is based on the respective pixel values of the two pixels of each block located closest to the block boundary, and in case abs[first offset]<first threshold value, the respective pixel values of the pixel of each block located next to the block boundary are modified on the basis of the first offset.

According to an alternative embodiment, the modifying of the respective pixel values of at least the two pixels next to the block boundary on the basis of the first offset is made unconditionally before a comparison between the first offset and the first threshold is executed, and in case abs[first offset]<first threshold value, the respective pixel values of the two pixels located one pixel away from the block boundary are modified on the basis of a second offset and a third offset, respectively.

One advantage with the suggested approach is that a limited amount of additional computations will be required, since the computation of the first offset is executed at an early stage of a filtering/modification process. A consequence from this will be that computations for, and modifications of the pixels located one pixel away from the block boundary will occur more seldom.

According to yet another embodiment, three consecutive pixels are first selected from the first block and three consecutive pixels from the neighboring block. During the calculating step the first offset is based on the respective pixel values of the two pixels of each block located closest to the block boundary, and in case abs[first offset]<first threshold the modifying can be divided into two modifying steps, where the respective pixel values of the two pixels located next to the block boundary are modified on the basis of the first offset, and where the respective pixel values of the two pixels located one pixel away from the block boundary are modified on the basis of a second offset and a third offset, respectively, wherein the second offset is based on the respective pixel values of the selected three pixels of the first block and the first offset, and the third offset is based on the respective pixel values of the three selected pixels of the neighboring block and the first offset.

The first offset is, according to one embodiment, an estimate of an expected modification of the pixel values of the two pixels located next to the block boundary, where these pixel values are estimated during deblocking filtering of the two pixel values. This has an advantage that the value of the offset that would be used in the filtering process is reused in the filtering decision.

According to another embodiment, the first offset is calculated as an approximation based on $(9*(q_0-p_0)-3*(q_1-p_1))/16$, where $p_0$ is the pixel value of the pixel of the first block located next to the block boundary, $p_1$ is the pixel value of the pixel of the first block located one pixel away from the block boundary, $q_0$ is the pixel value of the pixel of the neighboring block located next to the block boundary, and $q_1$ is the pixel value of the pixel of the neighboring block located one pixel away from the block boundary.

According to one embodiment, the modification of the pixel value $p_0$ of the pixel of the first block, located next to the block boundary, is executed by adding the first offset to pixel value $p_0$ and the modification of the pixel value $q_0$ of the pixel of the neighboring block, located next to the block boundary (20), is executed by subtracting the first offset from pixel value $q_0$.

Alternatively, the first offset may be calculated so that it equals $(9 \times (q0-p0)-3 \times (q1-p1)+8) >> 4$, wherein >> denotes a right shift operation.

According to one alternative embodiment, clipping may be applied wherein the first offset is clipped to be within an interval of $-t_C$ and $t_C$ by setting said first offset to be equal to $-t_C$ if the first offset is smaller than $-t_C$ and by setting the first offset to be equal to $t_C$ if the first offset is larger than $t_C$, wherein $t_C$ is a second threshold value that is dependent on a quantization parameter value assigned to the respective block.

The modification of the pixel value $p_1$ of the pixel of the first block located one pixel away from the block boundary is executed by adding a second offset to this pixel value $p_1$, where the second offset is calculated as an approximation of $(p_0+p_2-2*p_1+2*(\text{first offset}))/4$, where $p_2$ is the pixel value of the pixel of the first block located two pixels away from the block boundary along the mentioned line of pixels and wherein the modification of the pixel value $q_1$ of the pixel of the second block located one pixel away from the block boundary is executed by adding a third offset to the respective pixel value, where the third offset is calculated as an approximation of $(q_0+q_2-2*q_1-2*(\text{first offset}))/4$, where $q_2$ is the pixel value of the pixel of the second block located two pixels away from the block boundary along the mentioned line of pixels.

Alternatively, the second offset may be calculated such that it equals $(((p2+p0+1)>>1)-p1+\text{first offset})>>1$, wherein >> denotes a right shift operation; and the third offset may be calculated such that it equals $(((q2+q0+1)>>1)-q1-\text{first offset})>>1$. The second and the third offsets may be clipped in a way which corresponds to the clipping of the first offset.

The first threshold should be selected to an appropriate value and may according to one embodiment be determined on the basis of at least one quantization parameter value assigned to the respective block. Such quantization parameter values may be assigned to each respective block, wherein the first threshold may be determined on the basis of quantization parameter values assigned to the respective block, such that the value of the threshold is determined on the basis of any of: the maximum quantization parameter value, or the average value of said quantization parameter values.

Alternatively, the value of the first threshold may be determined as the delta clipping value multiplied with a predefined multiplier value.

In case clipping is applied, the absolute value of the first offset before the clipping operation is preferably used in the comparison of the first offset with the first threshold.

Although the described method is particularly suitable for handling video frames it may also be used for handling other types of images in a corresponding way.

According to another aspect a deblocking filter unit which is suitable for reducing blocking artifacts associated with consecutive pixels of a block boundary of an image, is also provided. The deblocking filter unit comprises a pixel selector configured to select at least two consecutive pixels from a first block and at least two consecutive pixels from a second neighboring block, where the blocks are located on opposite sides of a block boundary and the pixels forming a line of pixels which is perpendicular to the block boundary. An offset calculator of the deblocking filter unit is configured to calculate a first offset for the two pixels of each block located next to the block boundary, while an offset evaluator is configured to compare the first offset to a first threshold value. In addition, a pixel value modifier is configured to modify the respective pixel values of n consecutive pixels from the first block and the respective pixel values of m consecutive pixels from the neighboring block, by applying normal filtering on the respective pixels, in case abs[first offset]<first threshold at the offset evaluator, or to modify the respective pixel values of j consecutive pixels from the first block and the respective pixel values of k consecutive pixels from the second block, by applying weak filtering or no filtering at all on the respective pixels, in case abs[first offset]>=first threshold at the offset evaluator (63), where n>0, m>0 n>=j, and m>=k.

According to one embodiment, the offset calculator is configured to calculate the first offset on the basis of the respective pixel values of the two pixels of each block located closest to the block boundary, and the pixel value modifier is configured to modify at least the respective pixel values of the two pixels located next to the block boundary on the basis of the first offset in case abs[first offset]<first threshold value.

The pixel value modifier may also be configured to modify the respective pixel values of at least the two pixels next to the block boundary on the basis of the first offset, and wherein, in case it is determined by the offset evaluator that abs[first offset]<first threshold value, the pixel value modifier is configured to modify the pixel values of the two pixels one pixel away from the block boundary on the basis of a second offset and a third offset, respectively.

According to one embodiment, the pixel selector is configured to select three consecutive pixels from a first block and three consecutive pixels from a neighboring block, the offset calculator is configured to calculate the first offset on the basis of the respective pixel values of the two pixels of each block located closest to the block boundary, and wherein in case it is determined by the offset calculator that abs[first offset]<first threshold, the pixel value modifier is configured to modify the respective pixel values of the two pixels located next to the block boundary on the basis of the first offset, and to modify the respective pixel values of the two pixels located one pixel away from the block boundary on the basis of a second offset and a third offset, respectively, wherein the offset calculator is further configured to derive the second offset on the basis of the respective pixel values of said three pixels of the first block and said first offset, and the third offset on the basis of the respective pixel values of the three pixels of the neighboring block and the first offset.

According to one embodiment, the offset calculator is configured to estimate the first offset as an estimate of an expected modification of the pixel values of the two pixels located next to the block boundary, wherein these pixel values are estimated during deblocking filtering of the two pixel values.

According to another embodiment, the offset calculator is instead configured to calculate the first offset as an approximation based on $(9*(q_0-p_0)-3*(q_1-p_1))/16$ where $p_0$ is the pixel value of the pixel of the first block located next to the block boundary, $p_1$ is the pixel value of the pixel of the first block located one pixel away from the block boundary, $q_0$ is the pixel value of the pixel of the neighboring block located next to the block boundary, and $q_1$ is the pixel value of the pixel of the neighboring block located one pixel away from the block boundary.

According to one embodiment, the pixel value modifier is configured to modify the pixel value $p_0$ of the pixel of the first block located next to the block boundary, by adding the first offset to pixel value $p_0$ and to modify the pixel value $q_0$ of the pixel of the neighboring block located next to the block boundary, by subtracting the first offset from pixel value $q_0$.

Alternatively, the offset calculator may be configured to calculate the first offset to be equal to $(9\times(q0-p0)-3\times(q1-p1)+8)>>4$, wherein $>>$ denotes a right shift operation.

In addition, the deblocking filter unit may comprise a clipping unit configured to clip the first offset to be within an interval of $-t_C$ and $t_C$ by setting the first offset to be equal to $-t_C$ if the first offset is smaller than $-t_C$ and by setting the first offset to be equal to $t_C$ if the first offset is larger than $t_C$, wherein $t_C$ is a second threshold value that is dependent on a quantization parameter value assigned to the respective block.

The pixel value modifier may further be configured to modify pixel value $p_1$ of the pixel of the first block located one pixel away from the block boundary by adding a second offset to pixel value $p_1$, wherein the offset calculator is configured to calculate the second offset so that it equals $(p_0+p_2-2*p_1+2*(first offset))/4$, where $p_2$ is the pixel value of the pixel of the first block located two pixels away from the block boundary along the mentioned line of pixels and wherein the pixel value modifier is further configured to modify the pixel value $q_1$ of pixel of the second block located one pixel away from the block boundary by adding a third offset to this pixel value $q_1$, where the offset calculator is further configured to calculate the third offset as an approximation based on $(q_0+q_2-2*q_1-2*(first offset))/4$, where $q_2$ is the pixel value of the pixel of the second block located two pixels away from the block boundary along the mentioned line of pixels.

According to another embodiment, the offset calculator is configured to calculate the second offset so that it is equal $(((p2+p0+1)>>1)-p1+first offset)>>1$, wherein $>>$ denotes a right shift operation; and the third offset such that it is equal to $(((q2+q0+1)>>1)-q1-first offset)>>1$.

The clipping unit may further be configured to clip the second and third offset in a way which corresponds to clipping the first offset.

In case clipping is applied, the offset evaluator is configured to use the value of the first offset before clipping when performing the comparison operation (abs[first offset]<first threshold). The value of the first offset before or after the clipping can be used when calculating the second and the third offsets.

According to yet another aspect an encoder comprising a deblocking filter unit according to any of the embodiments mentioned above is provided.

According to another aspect a decoder comprising a deblocking filter unit according to any of the embodiments mentioned above is provided.

According to another aspect a user equipment is provided which comprise a memory configured to store encoded images, a decoder according to any of the embodiments described above configured to decode the encoded images into decoded images and a media player configured to render the decoded images into image data displayable on a display.

According to yet another aspect another user equipment is provided which comprise an encoder according to any of the embodiments described above, configured to encode images into encoded images, and to provide the encoded images to a receiving entity via an I/O unit.

According to another aspect a network device being or belonging to a network node in a communication network is provided, which network device is capable of distributing images between a sending unit and a receiving user equipment, the network device comprising an encoder according to any of the embodiments described above and/or a decoder (100) according to any of the embodiments described above.

According to another aspect a computer program for reducing blocking artifacts associated with consecutive pixels of a block boundary (20) of an image is provided, where the computer program comprises code means which when run on a computer causes the computer to execute the following: selecting at least two consecutive pixels from a first block and at least two consecutive pixels from a neighboring block, the blocks being located on opposite sides of a block boundary and the pixels forming a line of pixels which is perpendicular to the block boundary; calculating a first offset for the two pixels of each block located next to the block boundary, comparing the first offset to a first threshold value, and modifying the respective pixel values of n consecutive pixels from the first block and the respective pixel values of m consecutive pixels from the second block, by applying normal filtering on these pixels, in case abs[first offset]<first threshold, or modifying the respective pixel values of j consecutive pixels from the first block and the respective pixel values of k consecutive pixels from the second block, by applying weak filtering or no filtering at all on these pixels, in case abs[first offset]>=first threshold, where n>0, m>0 n>=j, and m>=k.

According to yet another aspect, a computer program product comprising computer readable code means and a computer program such as the one described above is provided and storable on the computer readable means.

Further details and examples relating to the embodiments described above will now be described in further detail below.

BRIEF DESCRIPTION OF THE DRAWINGS

The general concept of this document, together with further objects and advantages thereof, may best be understood by making reference to the following description taken together with the accompanying drawings, in which:

FIGS. 1a and 1b are schematic illustrations of pixel values representing a natural edge and a blocking artifact, respectively.

FIGS. 2a and 2b illustrate two embodiments of neighboring blocks of pixels separated by a vertically or horizontally oriented block boundary, respectively.

FIG. 3a-3c are flow charts illustrating alternative methods of reducing blocking artifacts according to different embodiments.

DETAILED DESCRIPTION

Figures 2B, 3A:
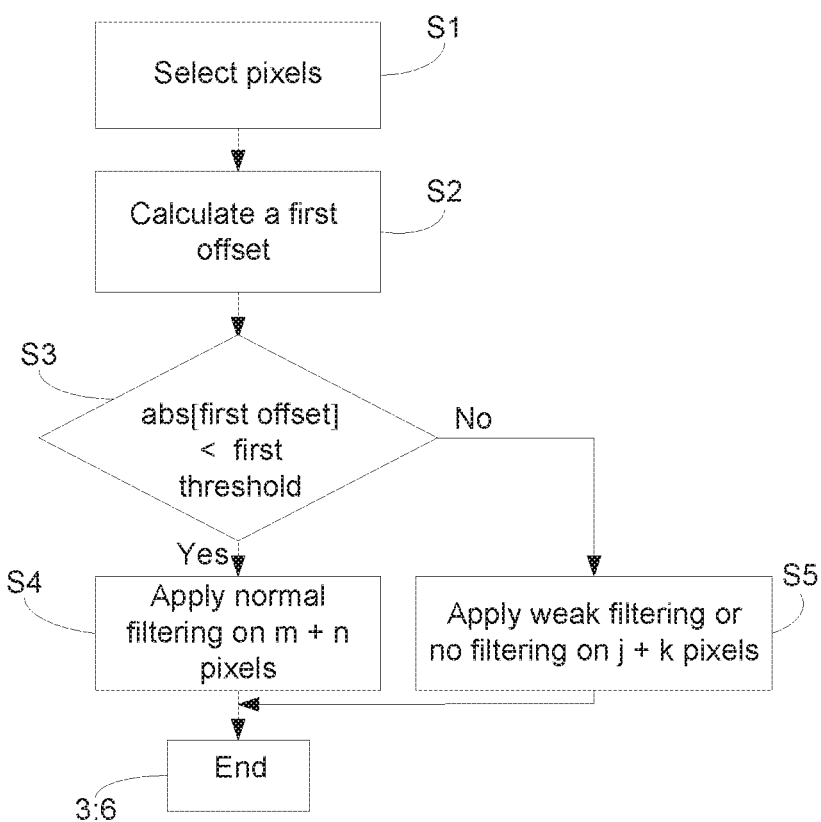

Throughout the drawings, the same reference numbers are used for similar or corresponding elements. The embodiments generally relate to deblocking filtering to combat blocking artifacts over block boundaries in a picture, which in a typical scenario is a video frame, where we assume an existing deblocking filter function for the first pixels of a block border. The pixel values are modified by an offset or a delta parameter ($\Delta$) that changes the original pixel values. If an original pixel value is A before filtering and B after filtering, the offset or delta parameter is B-A or A-B, such that the offset may be delta on one side of the block boundary and –delta on the other side of the block boundary. In the present context and throughout this document the expression boundary should correspond to the expressions edge or border.

The delta parameter is used in order to determine whether there is a blocking artifact at the block boundary or a natural edge. In case the value of delta exceeds a predefined threshold, here referred to as a first threshold, it is assumed that there is a natural edge which should only be exposed to a limited filtering or no filtering at all. More specifically, in such a situation only one pixel, or no pixel at all, is to be filtered on that particular block boundary.

FIG. 1a is an illustration of pixel values 10a, 11a, 12a of a first block, and 13a, 14a, 15a of a neighboring block, where the pixel values are representing a scenario with a natural edge at a block boundary 20. i.e., a distinct difference between the pixel values of pixels of the two neighboring blocks, which therefore require filtering which results in a reproduction of the indicated pixel values. Such a large difference between the pixel values is proposed to be of a natural origin rather than a blocking artifact.

FIG. 1b on the other hand is illustrating pixel values 10b, 11b, 12b, of a first block, and 13b, 14b, 15b of a neighboring block, where the difference between pixel values of opposite blocks is considerably smaller than what is the case for FIG. 1a and has probably appeared because of quantization and/or prediction used in video coding or any other image coding. More specifically, the pixel values of the pixels located in close vicinity of the boundary crossing of FIG. 1b is to be considered as forming a blocking artifact which, when identified, need to be handled according to the method described in this document, by applying filtering which results in a suitable approximation of identified pixel values of pixels located close to the block boundary, where, instead of filtering according to the straight lines of FIG. 1b, a filtering which results in an approximation according to the dotted line is required. In the present example two pixels of each block will be modified accordingly.

Each pixel in a block has a respective pixel value. Video frames generally have color values assigned to the pixels, where the color values are represented in a defined color formats. One of the common color formats uses one luminance component and two chrominance components for each pixel, although other formats exist, such as using red, green and blue components for each pixel.

Traditionally, luminance component filtering and chrominance component filtering are done separately possibly employing different filtering decisions and different deblocking filters. It is, though, possible that the luminance filtering decisions are used in chroma filtering, like in H.264/AVC. The embodiments can be applied to filter the luminance component, filter the chrominance component or filter both the luminance component and the chrominance component. In a particular embodiment, the embodiments are applied to achieve luminance or luma filtering. Filtering decisions, or parts of filtering decisions for one component, such as luma, can then be used when making the filtering decisions for other components, such as chroma.

Deblocking filtering is conducted over a boundary, edge or border between neighboring blocks. As a consequence, such boundaries can be vertical boundaries 20, as illustrated in FIG. 1a, 1b. In FIG. 2a a vertical boundary 20 is separating two 8×4 neighboring blocks 21, 22 present side by side in an image, such as a video frame. Alternatively, the boundaries are horizontal boundaries 20, separating two neighboring block 21, 22, where one block 21 is positioned above the other block 22 in the video frame, as indicated in FIG. 2b.

In a particular embodiment, vertical boundaries are filtered first starting from the left-most boundary and proceeding through the boundaries towards the right-hand side in their geometrical order. Then, horizontal boundaries are filtered starting with the boundary on the top and proceeding through the boundaries towards the bottom in their geometrical order. The embodiments are, however, not limited to this particular filtering order and can actually be applied according to any predefined filtering order. In a particular embodiment, the boundaries at the edge of the video frame are preferably not filtered and thereby excluded from a deblocking filtering.

According to the embodiments, "line of pixels" and "corresponding line of pixels" are employed to denote a "row of pixels" and a "corresponding row of pixels" in the case of a vertical block boundary as in FIG. 2a and denote a "column of pixels" and a "corresponding column of pixels" in the case of a horizontal block boundary as in FIG. 2b.

FIG. 3a is a flow chart describing a method of reducing blocking artifacts associated with consecutive pixels of a block boundary between a present block of multiple pixels and a neighboring block of multiple pixels in a video frame or any other image according to one embodiment.

The deblocking filtering will now be further described herein in connection with various implementation embodiments.

The method of the embodiment described in FIG. 3a is initiated by selecting consecutive pixels of a block boundary to be filtered, as indicated in step S1. In a next step S2 a first offset is calculated based on at least some of the selected pixels, and in another step S3, the absolute numerical value of the first offset. i.e., abs[first offset], is compared to a first threshold. If, it is determined in step S3 that the first threshold exceeds abs[first offset], normal filtering is executed by modifying the respective pixel values of consecutive pixels, as indicated with step S4. The latter step may be described as filtering of n pixels of the first block and m pixels of the neighboring block, where n>0 and m>0. However, if the condition mentioned above is not fulfilled, i.e., [first offset] is equal to or exceeds the first threshold, a limited filtering. i.e., a weak filtering, or even no filtering at all, is instead executed, as indicated with step S5. In the latter case less pixels will typically be modified than what is required if conventional filtering is applied. The latter case may be described as filtering of k pixels of the first block and l pixels of the neighboring block, where n>=j and m>=k. In a typical scenario, m and n equals 1 or 2 and may be either equal or differ from each other, while k and l are typically 0 or 1. Also j and k may differ from each other or be equal.

The described embodiment results in a decreased computational complexity of the filter, since in many situations, filtering of fewer pixel values will be required, compared to if conventional filtering is applied.

According to one embodiment, the value of the first threshold is selected such that it is dependent on a quantization parameter (QP) value assigned to the respective blocks, while according to another embodiment, the first threshold is instead determined as the delta clipping value multiplied with a predefined multiplier value. In the first alternative, more precise optimization of the clipping value and threshold is possible, since they do not depend on each other, while in the second alternative one does not need a separate table for threshold values. Instead, the same table as for the clipping values is used.

Figure 4:
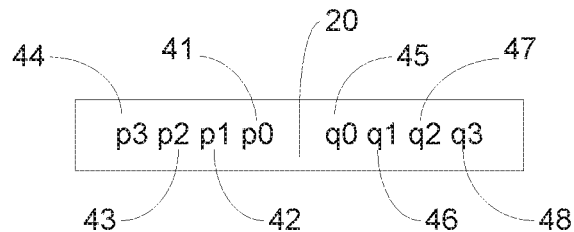
FIG. 4 is an illustration of a row of pixels separated by a vertical block boundary.

Consider that consecutive pixels 41,42,43,44 of a first block, referred to as p0, p1, p2 and p3, respectively, and consecutive pixels 45,46,47,48 of a neighboring block, referred to as q0, q1, q2 and q3, respectively, where the two blocks, separated by block boundary 20, as indicated in FIG. 4 are exposed to de-blocking filtering.

According to one embodiment, the first offset, calculated in step S2, will be based on the respective pixel values of the two pixels 41,42,45,46 of each block located closest to the block boundary, and in case abs[first offset] is less than the first threshold value in the evaluation in step S3, at least the respective pixel values of the two pixels 41,45 next to the block boundary 20 are modified on the basis of the first offset in the subsequent modifying step S4 of FIG. 3a.

More specifically, modification of pixels by way of filtering as described with reference to FIG. 3a may be executed in various ways.

Figure 3B:
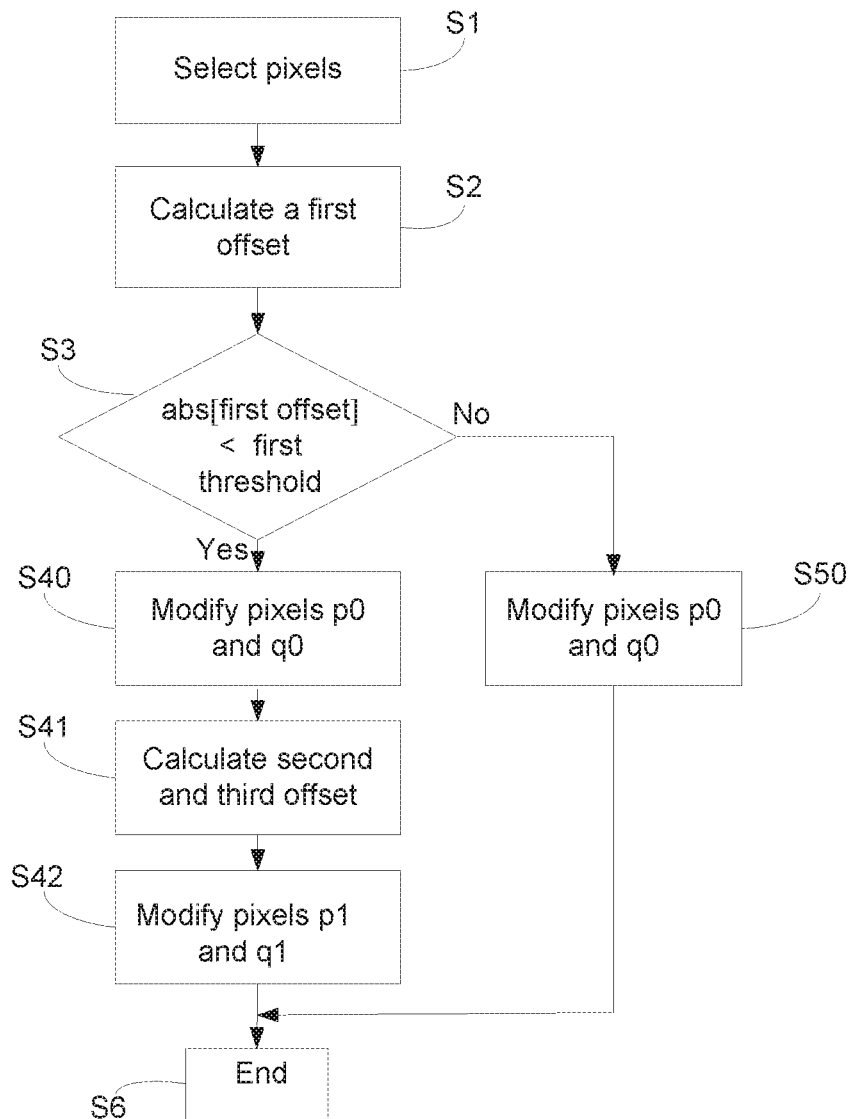

According to one embodiment, which will now be describe with reference to FIG. 3b, the respective pixel values of at least the two pixels 41,45 next to the block boundary 20 are modified unconditionally on the basis of the first offset, as indicated in step S40 or S50 in FIG. 3b and wherein, in case abs[first offset] is less than the first threshold value, the respective pixel values of the two pixels 42,46 one pixel away from the block boundary 20 are also modified, wherein the latter modification is executed on the basis of a second offset and a third offset, respectively in step S42, after the second and the third offset has been calculated in step S41.

The embodiment according to FIG. 3b may be exemplified as follows.

--- first offset = $(9*(q_0-p_0)-3*(q_1-p_1))/16$
$p_0'$ = $p_0$ + first offset
$q_0'$ = $q_0$ − first offset
   if ( abs(first offset) < thr1)
   {
      second offset = $(p_0+p_2-2*p_1+2*\text{first offset})/4$;
      $p_1'$ = $p_1$ + second offset
      third offset = $(q_0+q_2-2*q_1-2*\text{first offset})/4$;
      $q_1'$ = $q_1$ + third offset
   }

---

Here, the first offset is calculated as an approximation based on $(9*(q_0-p_0)-3*(q_1-p_1))/16$ in step S2, where $p_0$ is the pixel value of the pixel 41 of the first block 21 located next to the block boundary 20, $p_1$ is the pixel value of the pixel 42 of the first block 21 located next to the block boundary 20, $q_0$ is the pixel value of the pixel 45 of the neighboring block 22 located next to the block boundary 20, and $q_1$ is the pixel value of the pixel 46 of the neighboring block 22 located next to the block boundary 20.

The modification of pixel values p0 and q0 are executed irrespective of the outcome of the comparison in step S3, either by executing step S40 or S50. In both scenarios, the modification of the pixel value poof the pixel 41 of the first block 21 located next to the block boundary 20 is executed by adding the first offset to the pixel value $p_0$, and the modification of the pixel value $q_0$ of the pixel 45 of said neighboring block 22 located next to the block boundary 20 is executed by subtracting the first offset from the pixel value $q_0$.

The modifications executed in step S40 and S42 can be performed serially, as indicated in FIG. 3b, or serially but in an opposite order, i.e., step S41 and S42 are executed first followed by S40. Alternatively, steps S40 and S42 can be performed at least partly in parallel.

When applying the embodiment described above, the value of the first offset will be approximately equal to 0 if the signal is interpreted as being a ramp. i.e., identified as a straight line, or approximately a straight line, rather than a blocking artefact, while blocking artifacts at the block boundary 20 are reduced by processing pixels in one line of pixels as mentioned above. This pixel modification can be performed for one of the (horizontal or vertical) lines in the block, such as e.g., the line comprising pixels 41,42,43,44 of a block, as described above, or for multiple, i.e., at least two, lines in the block, possibly for all (horizontal or vertical) lines 12 in the block, by repeating the describe method steps for each line.

Figure 3C:
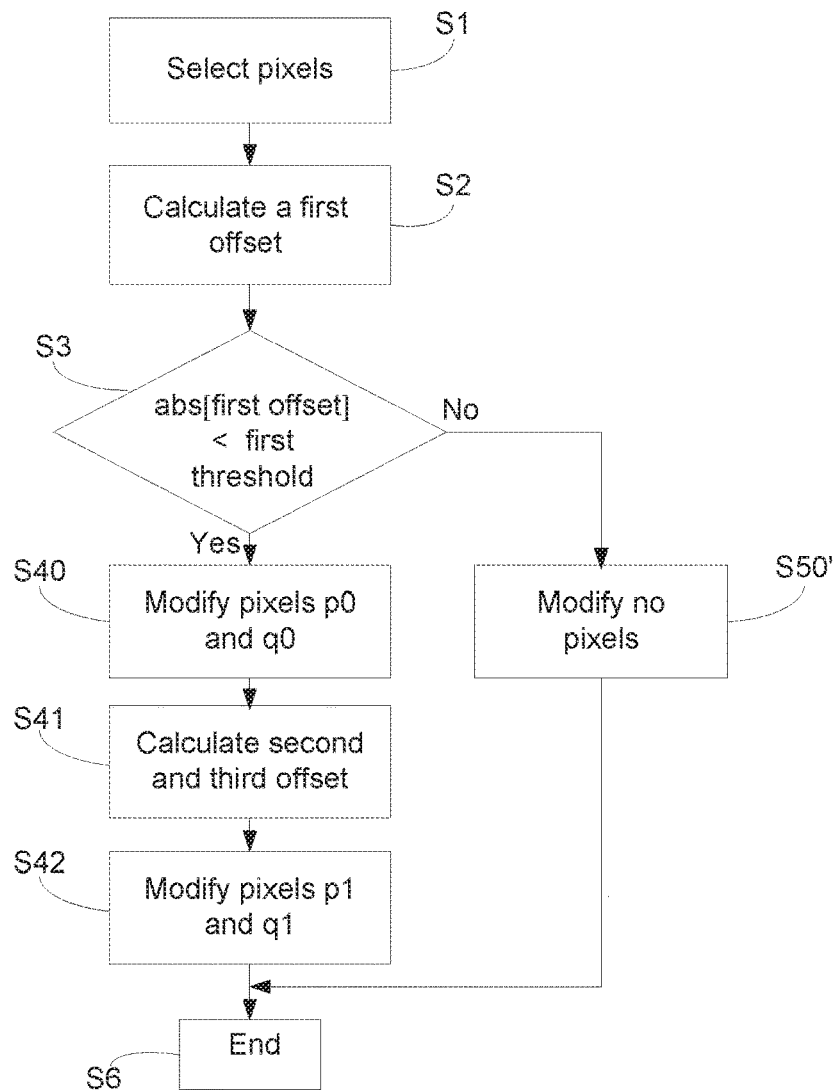

Generally, and as discussed in the foregoing, deblocking filtering involves filter decisions that determine whether a deblocking filter is to be applied over a horizontal or vertical block boundary for a block. If such a decision is positive the deblocking filter is then possibly applied to all columns (vertical lines) or rows (horizontal lines) of the block. Alternatively, further filtering decisions are taken for each column or row to decide whether deblocking filtering is to be applied or not and/or what type of deblocking filter to use for that particular column or row. Therefore, the method as illustrated in FIG. 3a or 3b, or 3c described below, could be applied to a column, to a row, to multiple columns, to multiple rows or both for at least one column and at least one row in a block of pixels in the video frame. It is further anticipated that deblocking filtering does not necessarily have to be applied to all blocks in the video frame. In clear contrast, such deblocking filtering is preferably only applied to the blocks and over block boundaries where there are blocking artifacts as determined by one or more filter decisions.

Clipping of the first offset can be performed in an embodiment to thereby restrict the value of the first offset to be within an interval of $-t_C$ and $t_C$. The threshold value $t_C$ is preferably dependent on a quantization parameter (QP) value assigned to the block. In such a case, a table of different threshold values for different QP values could be used.

Figure 5:
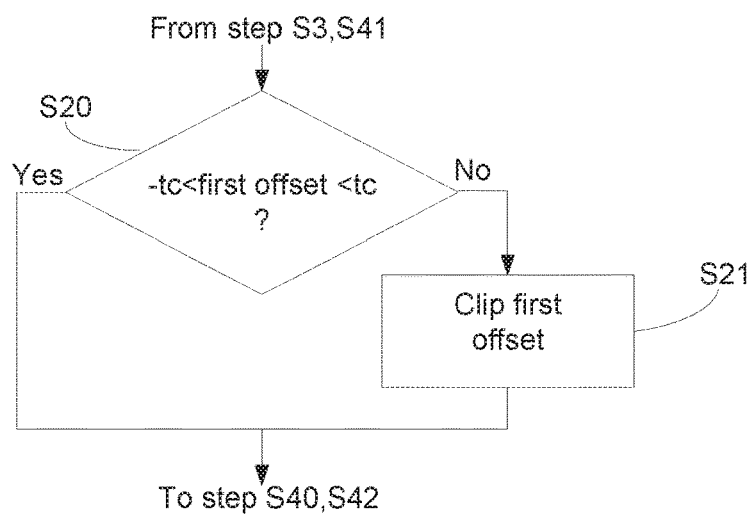
FIG. 5 is a flow chart illustrating a method of clipping an offset value according to one embodiment.

FIG. 5 is illustrating such a clipping action as a continuation from step S3 of FIG. 3a or 3b. According to FIG. 5 a next step S20 investigates whether the first offset is within the interval $-t_C$ and $t_C$, i.e., whether $-t_C \leq \text{first\_offset} \leq t_C$. In such a case, the method continues directly to step S40 of FIG. 3b or 3c and no modification of the first offset is required. However, if the first offset is not within the interval as determined in step S20 the method continues to step S21 where the first offset is clipped to have a value which is within the given interval. Thus, if first offset$<-t_C$ it is set to have a value of $-t_C$ in step S21. Correspondingly, if first offset$>t_C$ then it is set to have a value of $t_C$ in step S21. The method then continues to step S40 of FIG. 3b or 3c.

Similar to the first offset, the second and third offsets can be clipped to be within an interval of $-t_{C2}$ and $t_{C2}$, where the threshold value $t_{C2}$ is determined based on the QP value assigned to the block. In this case the process of FIG. 5 is executed between step S41 and S42 of FIG. 3b or 3c. In a particular embodiment the threshold value $t_{C2}$ is determined based on the threshold value $t_C$ used for clipping the first offset in FIG. 5. For instance, $t_{C2}=t_C/2$ or with a hardware adapted implementation $t_{C2}=t_C>>1$, where $t_C>=0$.

It is to be understood that in case clipping is applied in any of the embodiments described herein, the value of the first offset derived before clipping is to be used in the comparison with the first threshold. Furthermore, when calculating the second and the third offsets, either the value of the first offset before or after the clipping can be used.

The value of the first threshold may according to one embodiment depend on a quantisation parameter (QP), as the blocking artefact strength also depends on the QP. Alternatively, the delta clipping value tc(QP) may be used together with some multiplier, where the tc may typically be read from a table tc(QP). By way of example, the value tc*8 can be used. Alternatively, the threshold can be read and selected from a separate table thr1(QP).

The embodiment described above when applied in the programming language may look like the following example.

first offset=(9*(q0−p0)−3*(q1−p1)+8)>>4;

adelta=abs(first offset);

first offset=Clip3(−tc,tc,first offset):

piSrc[−iOffset]=Clip((p0+first offset));

piSrc[0]=Clip((q0−first offset));

if (adelta<tc*8){ second offset=Clip3(−tc2,tc2,((((p2+p0+1)>>1)−p1+ first offset)>>1));

third offset=Clip3(−tc2,tc2,((((q2+q0+1)>>1)−q1− first offset)>>1));

piSrc[−iOffset*2]=Clip((p1+second offset));

piSrc[iOffset]=Clip((q1+third offset));

Here (X+8)>>4 is used as an integer-expression of X/16, where >> denotes a right shift operation. Thus, in the particular embodiment mentioned above, step S2 calculates the first offset to be based on and equal to or calculated as an approximation of (9×(q0−p0)−3×(q1−p1)+8)>>4.

Here the Clip3 function is describing clipping of the output values to the range between the two first function arguments. In addition, the value of the first offset to be applied before the clipping can also be used in (abs[first offset]>first threshold).

In alternative embodiments other implementations, such as integer representations of (9× (q0−p0)−3× (q1−p1))/16 and preferably such integer representations that are efficiently implemented in hardware and/or software are used.

Different quantization parameter values may be assigned to each of the blocks and wherein the first threshold is determined on the basis of quantization parameter values assigned to the respective block, such that the value of the first threshold is determined on the basis of the relevant maximum quantization parameter value or an average of quantization values of the two blocks that form the block boundary.

In another embodiment, either two pixels on either side of the block boundary are modified, or no pixel at all is modified. Such an embodiment is illustrate in FIG. 3c, where in case the first threshold does not exceeds abs[first offset] no filtering is executed as indicated with step S50', which replaces step S50 of FIG. 3b, while if the first threshold exceeds abs[first offset] the same procedure as in FIG. 3b is executed. Such a method may be described as follows:

first offset=$(9*(q_0-p_0)-3*(q_1-p_1))/16$

```
if ( abs[first offset] < thr1)
{
    p₀' = p₀ + first offset
    q₀' = q₀ - first offset
    second offset = (p₀+p₂-2*p₁+2*first offset)/4;
    p₁' = p₁ + second offset
    third offset = (q₀+q₂-2*q₁-2*first offset)/4;
    q₁' = q₁ + third offset
}
```

The embodiment described above when applied in the programming language and when applying clipping may look like the following example:

```
first offset= (9*(q0-p0) -3*(q1-p1) + 8)>>4 ;
if (abs(first offset)<tc*8){
    first offset= Clip3(-tc, tc, first offset );
    piSrc[-iOffset] = Clip((p0+first offset));
    piSrc[0]= Clip((q0-first offset));
    second offset = Clip3(-tc2, tc2, (( ((p2+p0+1)>>1)- p1+first
    offset)>>1));
    third offset = Clip3(-tc2, tc2, (( ((q2+q0+1)>>1)- q1-first
    offset)>>1));
    piSrc[-iOffset*2] = Clip((p1+delta1));
    piSrc[ iOffset] = Clip((q1+delta2));
}
```

In the example given above tc*8 is used as the first threshold, but other alternative values for the first threshold may be used instead.

Also in this scenario, step S3 and S41 of FIG. 3b or 3c is followed by step S20 and S21, if applicable, of FIG. 5 before step S40 or S42, respectively, is executed.

The above disclosed embodiments defines a deblocking filter that generates a first offset for the pixels closest to the block boundary with a formula that produces approximately zero, preferably exactly zero, when applied to a ramp of pixel values and which produces an offset value that smoothes a step in the pixel values when applied to a step of pixel values. For instance, a ramp can be described as linearly increasing or decreasing pixel values, e.g., 10, 20, 30, 40. When calculating the first offset for these pixel values, i.e., p1=10, p0=20, q0=30, q1=40, the first offset will be zero. Correspondingly, a step can be described as a step increase or decrease in pixel values, e.g., 10, 10, 20, 20. When calculating the first offset for these pixel values, i.e. p1=10, p0=10, q0=20, q1=20, the first offset will be 3.75 if first_offset=(9×(q0−p0)−3×(q1−p1))/16 or 4 if first_offset= (9× (q0−p0)−3× (q1−p1)+8)>>4. The modified pixel values will then be 10, 13.75, 16.25, 30 or 10, 14, 16, 20, respectively, and thereby a smoothing of the step is achieved. The first offset is also zero for a flat line, i.e., if the pixel values are equal, p0=p1=q0=q1.

The present embodiments are adapted for combating blocking artifacts in connection with coding and decoding of images in general and in particular video of frames. The embodiments can therefore be applied to such video coding and decoding standards which divide video frames into blocks of pixels and thereby run a risk of having blocking artifacts over block boundaries. Examples of such standards, to which the present embodiments can be applied, are H.264 and HEVC as already mentioned above. In particular, HEVC has the possibility to select between a weak filtering mode and a strong filtering mode. The present embodiments can then advantageously be used in the weak filtering mode in order to calculate offsets that are employed to modify the pixel values in a line of pixels and a corresponding line of pixels over a block boundary. Hence, the decisions whether to perform such deblocking filtering according to the prior art HEVC can advantageously be used for the present embodiments.

Figure 6:
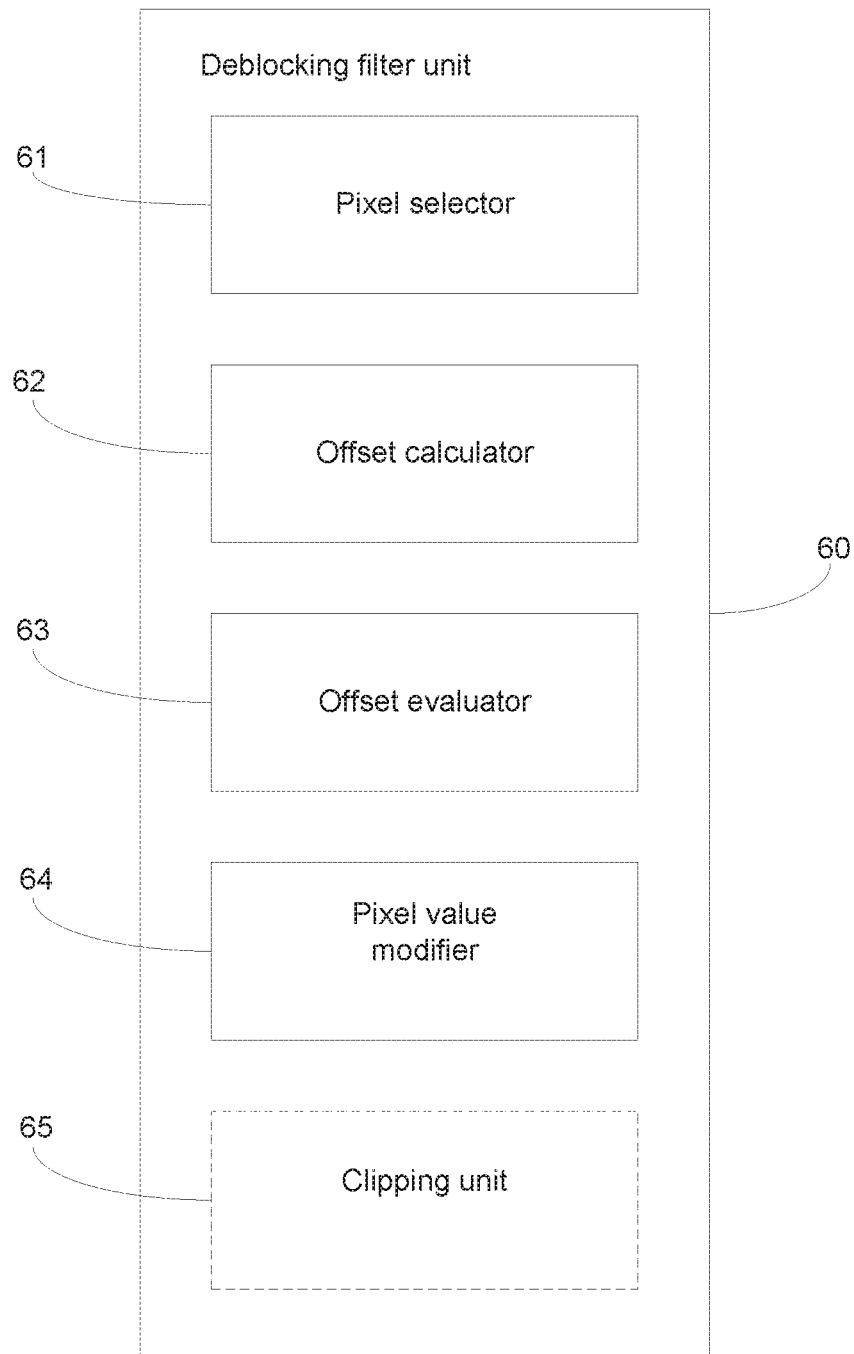
FIG. 6 is a block scheme of a deblocking filter unit according to one embodiment.

A method of reducing blocking artifacts according to any of the embodiments disclosed in any of FIG. 3a-3c is preferably performed by a deblocking filter unit. Hence, such a deblocking filter unit then selects relevant pixels in step S1, calculates the first offset in step S2, compares the first offset to the first threshold in step S3 and modifies the respective pixel values in any of steps S4, S5, S40, S42 or S50. FIG. 6 is a schematic block diagram of an embodiment of such a deblocking filter unit 60.

The deblocking filter unit 60 comprises a pixel selector 61 configured to select relevant pixels, an offset calculator 62 configured to calculate a first offset, a second offset and a third offset, as previously disclosed herein, for a line of pixels in a block of pixels in an image.

An offset evaluator 63 is configured to evaluate a calculated offset by comparing it to a threshold value in order to determine which pixels to modify by way of filtering and how the respective pixels are to be modified, a pixel value modifier 64 of the deblocking filter unit 60 is configured to modify the pixel values, depending on the outcome of the offset evaluator. According to one embodiment, the pixel value modifier 64 is configured to apply normal filtering by modifying one or more pixel values if abs[first offset]<first threshold or to apply weak filtering by modifying fewer pixel values or no pixel values at all otherwise. Thereby normal filtering or weak filtering or no filtering at all will be applied by the deblocking filter unit 60, depending on which alternative functionality of the pixel value modifier that is activated on the basis of the result of the offset evaluator 63.

The pixel value modifier 64 is configured to modify the pixel value of a pixel closest to a block boundary in the line of pixels in the block by adding the first offset calculated by the offset calculator 62 to the pixel value of this pixel to form a modified pixel value in case this is required based on the outcome of the offset evaluator 63. In a corresponding way, the pixel value modifier 64 is further configured to modify the pixel value of a pixel closest to the block boundary but in a corresponding line of pixels in a neighboring block of pixels in the image. This latter modification by the pixel value modifier 64 is achieved by subtracting the first offset calculated by the offset calculator 62 from the pixel value of this pixel to form a modified pixel value.

Hence, in a particular embodiment the pixel value modifier 64 is capable of adding the first offset to the pixel value of the pixel closest to the block boundary in the line of pixels to form a modified pixel value. The pixel value modifier 64 is further capable of subtracting the first offset from the pixel value of the pixel closest to the block boundary in the corresponding line of pixels to form a modified pixel value, or to avoid modifying a pixel value at all, all depending on the outcome of the offset evaluator 63.

In a particular embodiment, the offset calculator 62 is configured to calculate the first offset to be $f((9\times (q0-p0)-3\times (q1-p1))/16)$, i.e., a function $f( )$ or representation of $(9\times(q0-p0)-3\times(q1-p1))/16$. This function preferably outputs an integer representation of $(9\times (q0-p0)-3\times(q1-p1))/16$ and preferably the function is suitable for hardware implementation. The offset calculator 62 is configured, in an embodiment, to calculate the first offset such that it is equal to or an approximation of $(9\times (q0-p0)-3\times(q1-p1)+8)>>4$. In the latter case a clipping unit 65 is configured to apply clipping e.g., of a calculated first offset to be within an interval of $-t_C$ and $t_C$, where the value $t_C$ may be dependent on a QP value associated with the block, which value may e.g., be taken from a table or any other data source accessible by the clipping unit 65. When clipping is applied, the offset evaluator 63 is configured to use the first offset derived before clipping in the comparison with the first threshold. In a corresponding way the clipping unit 65 is configured to also clip the second and third offset accordingly. The offset calculator 62 may however be configured to calculate the second and the third offsets based on the value of the first offset before or after the clipping.

Alternatively, the deblocking filter unit 60 may comprise a plurality of clipping units, each being configured to clip one or more offset values accordingly.

In a preferred embodiment the offset calculator 62 is also configured to calculate a second offset based on $(p2+p0-2\times p1+2\times\Delta)/4$ for a line of pixels in a block.

In a particular embodiment, the offset calculator 62 is configured to calculate the second offset to be $g((p2+p0-2\times p1+2\times\Delta)/4)$. i.e., a function $g( )$ or representation of $(p2+p0-2\times p1+2\times\Delta)/4$. This function preferably outputs an integer representation of $(p2+p0-2\times p1+2\times\Delta)/4$ and preferably the function is suitable for hardware implementation. The offset calculator 62 is configured, in an embodiment, to calculate the second offset to be based on, equal to or calculated as an approximation of $(((p2+p0+1)>>1)-p1+\Delta)>>1$.

The offset calculator 62 is also configured to calculate a third offset based on $(q2+q0-2\times q1-2\times\Delta)/4$ for a corresponding line of pixels in a neighboring block.

The offset calculator 62 is also configured to calculate a third offset based on $(q2+q0-2\times q1-2\times\Delta)/4$ for a corresponding line of pixels in a neighboring block.

In a particular embodiment, the offset calculator 62 is configured to calculate the third offset to be $h((q2+q0-2\times q1-2\times\Delta)/4)$, i.e., a function $h( )$ or representation of $(q2+q0-2\times q1-2\times\Delta)/4$. This function preferably outputs an integer representation of $(q2+q0-2\times q1-2\times\Delta)/4$ and preferably function is suitable for hardware implementation. The third offset calculator 260 is configured, in an embodiment, to calculate the third offset to be based on, equal to, or calculated as an approximation of $(((q2+q0+1)>>1)-q1-\Delta)>>1$.

Alternatively, the deblocking filter unit 60 may comprise a plurality of offset calculators, each being configured to calculate one or more of the first, second and third offset.

The pixel value modifier 64 of the deblocking filter unit 60 is furthermore configured to modify the pixel value of the pixel next closest to the block boundary in the line of pixels in the block, i.e., in case the condition set up for the offset evaluator, i.e., abs[first offset]<first threshold, is fulfilled. If the mentioned condition is fulfilled, the pixel value modifier 64 may also add the second offset calculated by the offset calculator 62 to the pixel value of this pixel. For the same reason, the pixel value modifier 64 is additionally configured to modify the pixel value of the pixel next closest to the block boundary but in the corresponding line of pixels in the neighboring block. This modification is achieved by adding the third offset calculated by the offset calculator 62 to the pixel value of this pixel.

According to one embodiment the pixel value modifier 64 is configured to modify only one pixel closest to the block boundary of each block if abs[first offset]>=first threshold, while according to another embodiment, no pixel value at all is modified in such a scenario.

A particular aspect relates to a deblocking filter unit 60 for reducing blocking artifacts at a block boundary between a block of multiple pixels and a neighboring block of multiple pixels in an image. With reference to FIG. 6, the deblocking filter unit 60 comprises an offset calculator 62 configured to calculate a first offset based on a pixel value of a pixel closest to the block boundary in a line of pixels in the block, a pixel value of a pixel next closest to the block boundary in the line of pixels, a pixel value of a pixel closest to the block boundary in a corresponding or opposing line of pixels in the neighboring block and a pixel value of a pixel next closest to the block boundary in the corresponding line of pixels. The line of pixels and the neighboring line of pixels are perpendicular to the block boundary.

The first offset is calculated by the offset calculator 62 based on these pixel values and a formula that produces an offset value that approximates zero, and preferably equals zero, when the pixel values are linearly increasing or decreasing or are the same when traveling along the line of pixels and the corresponding line of pixels and produces an offset value that smoothes a step in the pixel values when the pixel values increase or decrease in a step when traveling along the line of pixels and the corresponding line of pixels. The deblocking filter unit 60 also comprises a pixel value modifier 64 configured to modify the pixel value of the pixel closest to the block boundary in the line of pixels by adding the first offset to the pixel value of the pixel closest to the block boundary in the line of pixels to form a modified pixel value. The pixel value modifier 64 is further configured to modify the pixel value of the pixel closest to the block boundary in the corresponding line of pixels by subtracting the first offset from the pixel value of the pixel closest to the block boundary in the corresponding line of pixels to form a modified pixel value.

Although the respective units 61-65 disclosed in conjunction with FIG. 6 has been disclosed as physically separate units in the described deblocking filter unit 60, and all may be special purpose circuits, such as ASICs (Application Specific Integrated Circuits), alternative embodiments of the deblocking filter unit 60 are possible where some or all of the units 61-65 are implemented as computer program modules running on a general purpose processor. Such an embodiment is disclosed in FIG. 7.

Figure 7:
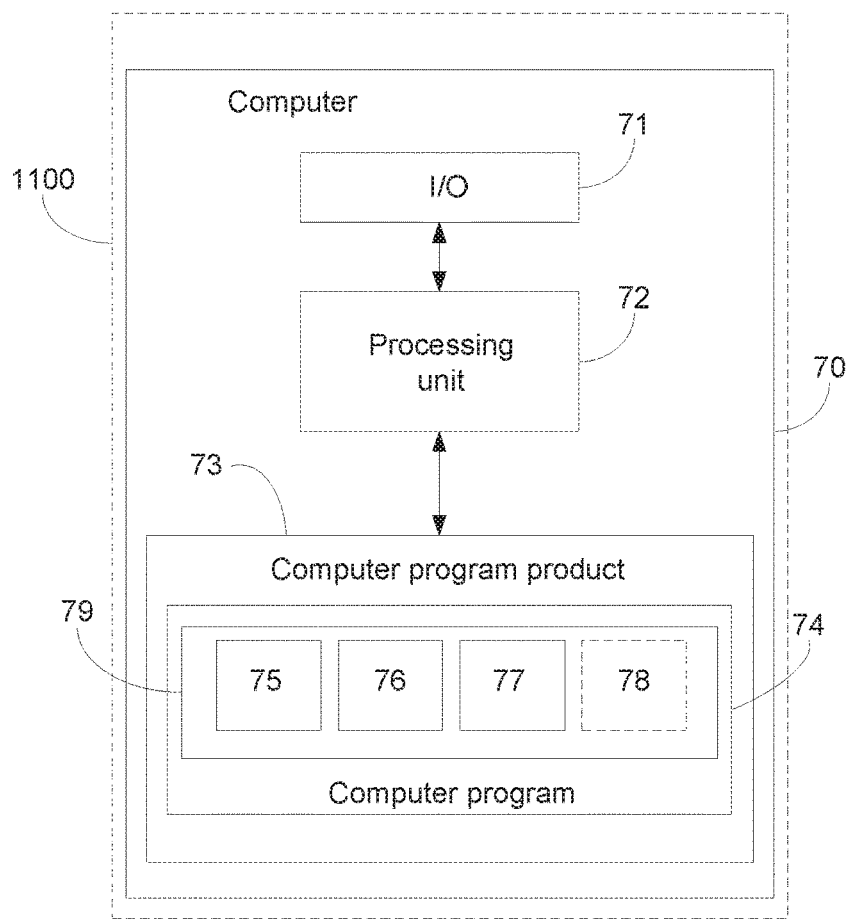
FIG. 7 is a schematic illustration of a computer comprising a deblocking filter module according to one embodiment.

FIG. 7 schematically illustrates an embodiment of a computer 70 having a processing unit 72, such as e.g., a DSP (Digital Signal Processor) or a CPU (Central Processing Unit). The processing unit 72 can be a single unit, as indicated in FIG. 7, or a plurality of units configured to perform different steps of the method described herein. The computer 70 also comprises an input/output (I/O) unit 71 for receiving recorded or generated video frames or encoded video frames or decoded video data or any other image which has been processed in a corresponding way. The I/O unit 71 has been illustrated as a single unit in FIG. 7 but can likewise be arranged in the form of a separate input unit and a separate output unit.

Furthermore, the computer 70 comprises at least one computer program product 73 in the form of a non-volatile memory, for instance an EEPROM (Electrically Erasable Programmable Read-Only Memory), a flash memory or a disk drive. The computer program product 73 comprises a computer program 74, which comprises code means which when run on the computer 70, such as by the processing unit 72, causes the computer 70 to perform the steps of the method described in the foregoing in connection with any of FIG. 3*a*, 3*b* or 3*c*. Hence, in an embodiment the code means in the computer program 74 comprises a pixel selector module 75 for selecting pixels for processing, an offset calculating module 76 for calculating the required offset values and a pixel value modifying module 77 for modifying pixel values of a deblocking filter module 79 or a deblocking filter device. The modules described above, which together form, or form part of a deblocking filter module 79, essentially perform the steps of the flow diagram in any of FIG. 3*a*, 3*b* or 3*c* when run on the processing unit 72. Thus, when the different modules are run on the processing unit 72 they correspond to the corresponding units 91-65 of FIG. 6.

The computer program 74 may additionally comprise a clipping module 78, as well as other separate modules, for the same reason as the units of FIGS. 3*a*, 3*b* and 3*c* may be configured as separate units.

The computer 70 of FIG. 7 can be a user equipment or be present in a user equipment 1100. In such a case, the user equipment 1100 may additionally comprise or be connected to a display (not shown) to enable displaying of video data and/or other image data. It is to be understood that computer 70 described above typically may comprise further entities, which are however not necessary for the understanding of the deblocking mechanism which is focused on in the present document and which therefore are not shown in FIG. 7 for simplicity reasons.

Figure 8:
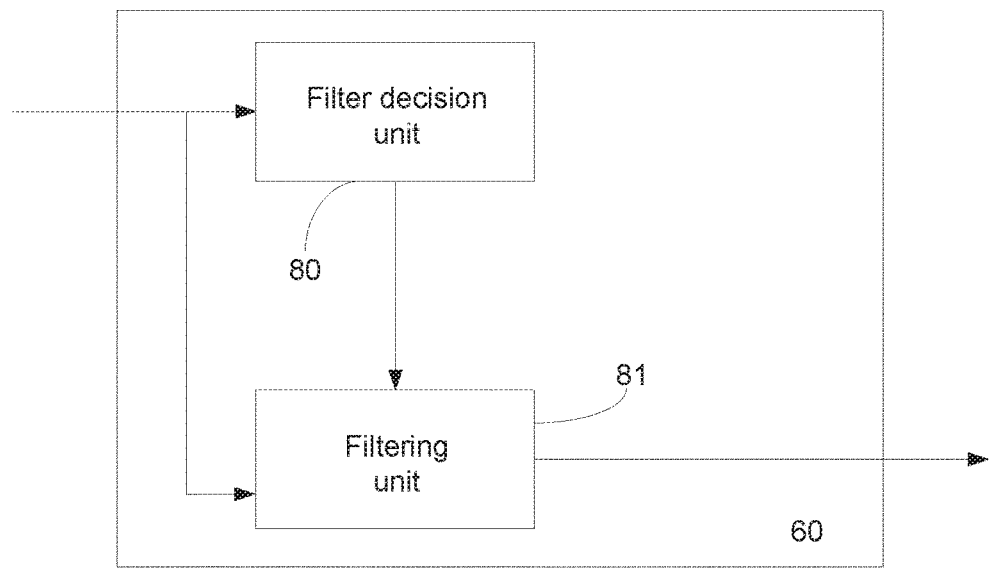
FIG. 8 is an alternative schematic illustration of the deblocking filter unit of FIG. 6 or the deblocking filter module of FIG. 7.

The deblocking filter unit 60 of FIG. 6 or the deblocking filter module 79 of FIG. 7 may also be illustrated in accordance with FIG. 8 where units 61-63 are represented by a filter decision unit 80 which is configured to process pixels of a video frame or other image as described above for the respective unit, and where unit 64 and optionally also 65 of FIG. 6 are represented by a filtering unit 81 in FIG. 8, where the filtering unit 81 is configured to filter the image by modifying the respective pixels as indicated above for the respective unit.

The deblocking filter unit 60 of FIG. 6 or the deblocking filter module 79 of FIG. 7 is preferably used in video coding. It functions and is therefore preferably implemented both in a video encoder and in a video decoder. The video decoder can be implemented preferably in hardware but also in software. The same holds for the video encoder.

Figure 9:
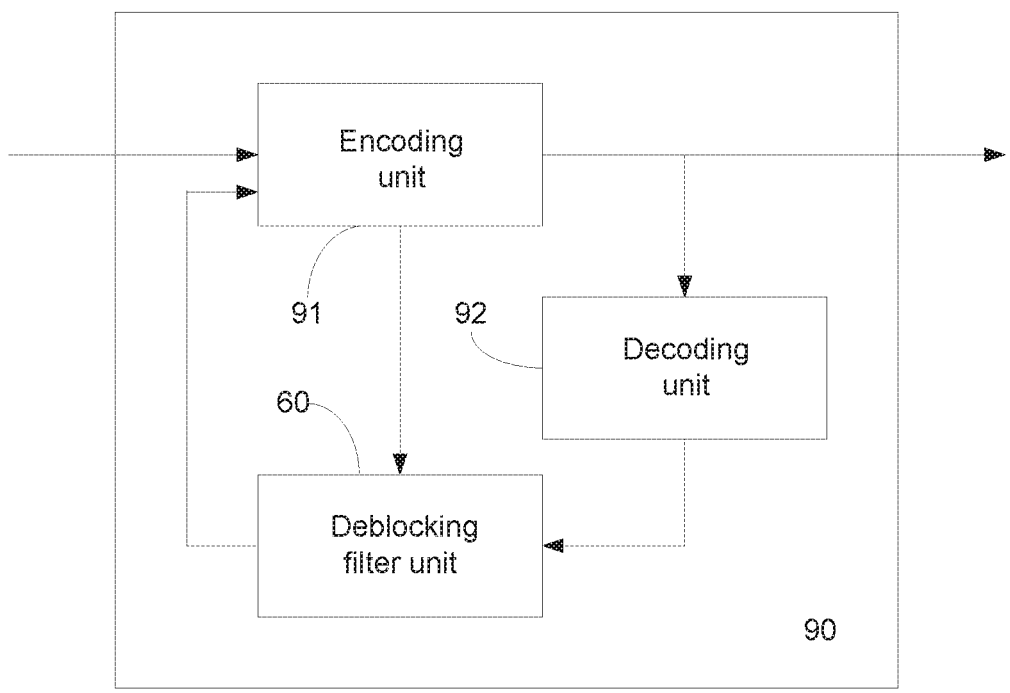
FIG. 9 is a schematic illustration of an encoding unit comprising a deblocking filter unit according to one embodiment.

FIG. 9 is a schematic block diagram of a simplified encoder 90 for encoding a block of pixels in an image, such as e.g., a video frame of a video sequence, according to an embodiment, where the encoder 90 comprises an encoding unit 91 for encoding a received video frame, a decoding unit 92 for decoding content about to be filtered, and a deblocking filter unit 60, as described above.

Figure 10:
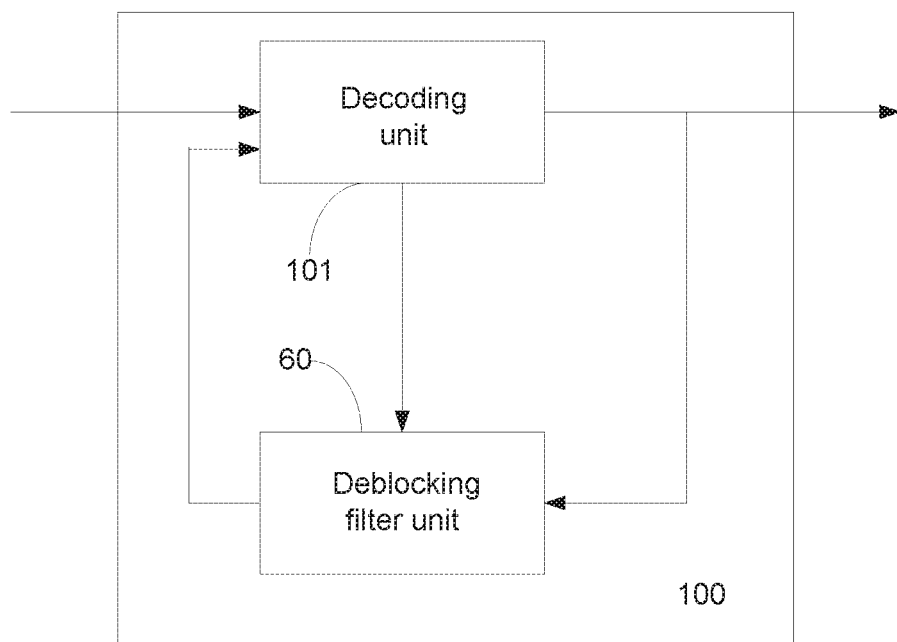
FIG. 10 is a schematic illustration of a decoding unit comprising a deblocking filter unit according to one embodiment.

FIG. 10 is a schematic block diagram of a simplified decoder 100, comprising a decoding unit 101 for decoding a received video frame or other type of image and a deblocking filter unit 60, where the decoder 100 may typically be arranged into a user equipment (not shown), where the user equipment can be any device having media decoding functions that operates on an encoded video stream of encoded video frames to thereby decode the video frames and make the video data available. Non-limiting examples of such devices include mobile telephones and other portable media players, tablets, desktops, notebooks, personal video recorders, multimedia players, video streaming servers, set-top boxes. TVs, computers, decoders, game consoles, etc. The user equipment typically also comprises a memory configured to store encoded video frames.

Figure 11A:
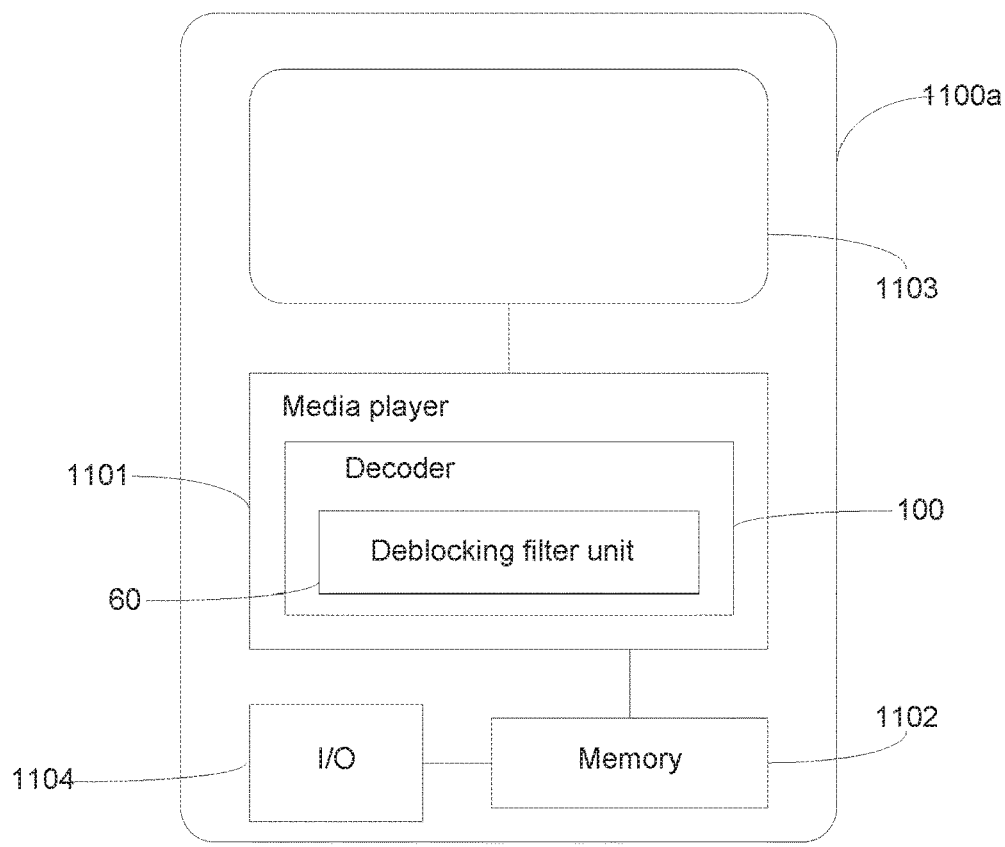
FIG. 11a is a schematic illustration of a user equipment comprising a decoder and a deblocking filter unit according to one embodiment.

In FIG. 11, a user equipment 1100*a* has been illustrated as comprising both a decoder 100 and a media player 1101, with the decoder 100 implemented as a part of the media player 1001. This should, however, merely be seen as an illustrative but non-limiting example of an implementation embodiment for the user equipment 1100*a*. Encoded video frames or other images are typically brought from a memory 1102 to the decoder 100, where the decoder 100 comprises a deblocking filter unit 60 according to any of the embodiments described above.

The decoder 100 decodes the encoded video frames (video bitstream) into decoded video frames. The decoded video frames are then provided to the media player 1101 that is configured to render the decoded video frames into video data that is displayable on a display or screen 1103 of, or connected to the user equipment 1100.

Also distributed implementations where the decoder 100 and the media player 1101 are provided in two physically separated devices are possible and within the scope of user equipment 1100, as used herein. A display 1103 of the user equipment 1100 could also be provided as a separate device connected to the user equipment 1100, where the actual data processing is taking place.

Figure 11B:
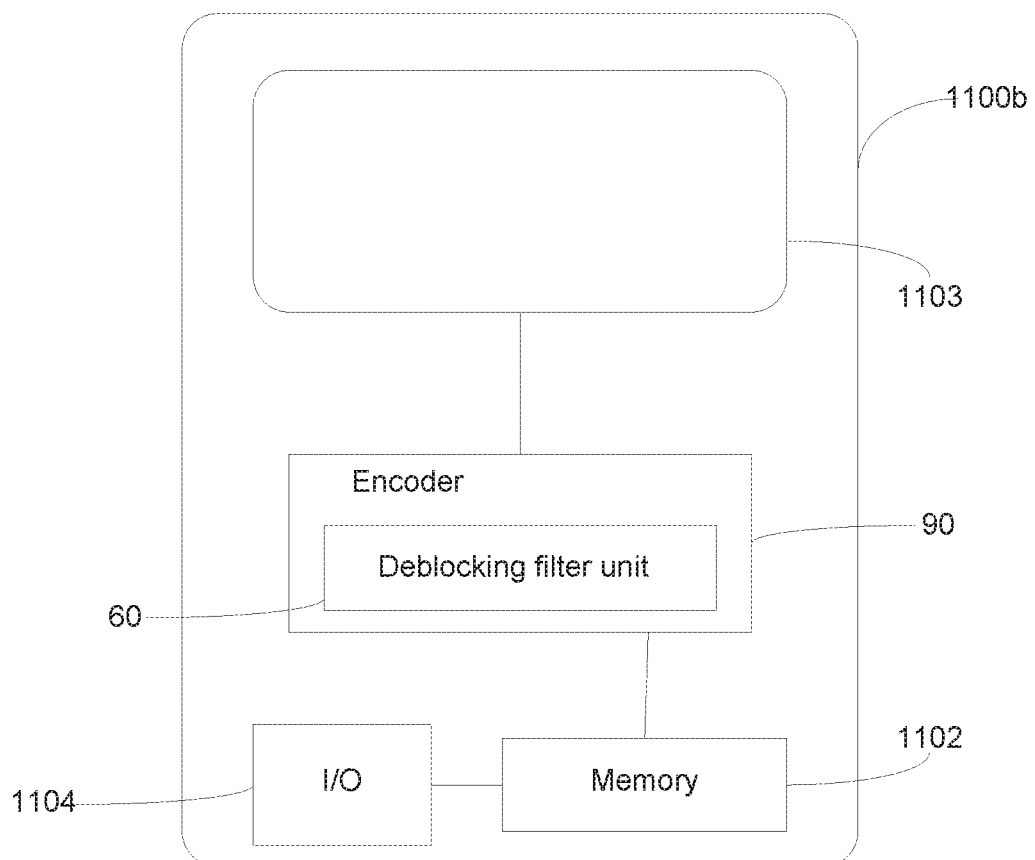
FIG. 11b is a schematic illustration of another user equipment comprising an encoder and a deblocking filter unit according to another embodiment.

In a corresponding way a user equipment 1100*b*, such as e.g., a cam-coder, a mobile phone capable of recording video, or a video conference equipment, may be equipped with an encoder, as indicate in FIG. 11*b*, where an encoder 90 comprising, or connected to, a deblocking filter unit 60 according to any of the embodiments described above, is capable of providing encoded images which have been processed accordingly by the deblocking filtering unit 60 to any type of entity capable of receiving and processing such images, by applying any type of conventional functionality. Here the user equipment 1100*b* is provided with a memory 1102 for storing images before transmitting them and an I/O unit 1104.

Figure 12:
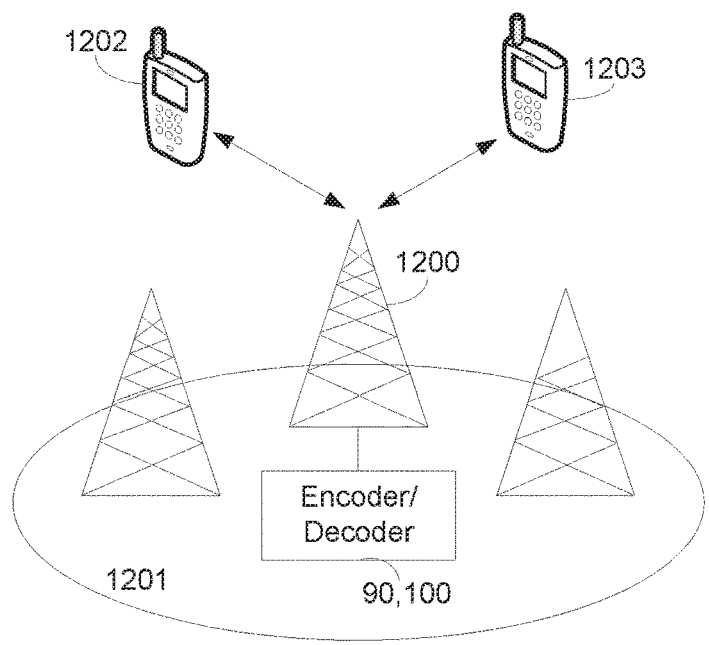
FIG. 12 is a schematic illustration of a network device in a communication network where the network device is equipped with a encoder and/or decoder provided with a deblocking filter unit according to one embodiment.

As illustrated in FIG. 12, the encoder 90 and/or decoder 100, such as the one illustrated in FIGS. 9 and 10, respectively, may be implemented in a network device 1200 being or belonging to a network node in a communication network 1201 between a sending unit 1202 and a receiving user equipment 1203. Such a network device 1200 may e.g., be a device for converting video according to one video coding standard to another video coding standard, for example, if it has been established that the receiving user equipment 1203 is only capable of or prefers another video coding standard than the one sent from the sending unit 1202. The network device 1200 can be in the form of or comprised in a radio base station, a Node-B or any other network node in a communication network 1201, such as a radio-based network.

In addition to using the suggested deblocking filter unit in an in-loop filter in an encoder or a decoder, the deblocking filter unit may alternatively be implemented into a post-filter and configured to apply post-processing while applying deblocking according to any of the embodiments described above.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

What is claimed is:

1. A method for decoding an encoded video image, the method comprising:
selecting two consecutive pixels, comprising a first pixel and a second pixel, from a first block and two consecutive pixels, comprising a third pixel and a fourth pixel, from a neighboring block, the blocks being located on opposite sides of a block boundary and next to the block boundary, and the first, second, third, and fourth pixels forming a line of pixels that is perpendicular to the block boundary,
where the first pixel is located in the first block next to the block boundary and has a first pixel value $p_0$, the second pixel is located in the first block one pixel away from the block boundary and has a second pixel value $p_1$, the third pixel is located in the neighboring block next to the block boundary and has a third pixel value $q_0$, and the fourth pixel is located in the neighboring block one pixel away from the block boundary and has a fourth pixel value $q_1$;
calculating a first offset as a function of the first pixel value $p_0$, the second pixel value $p_1$, the third pixel value $q_0$, and the fourth pixel value $q_1$; and
when an absolute value of the first offset is less than a first threshold:
modifying the first pixel value $p_0$ by adding the first offset to the first pixel value $p_0$;
modifying the third pixel value $q_0$ by subtracting the first offset from the third pixel value $q_0$;
modifying the second pixel value $p_1$ based on a second offset; and modifying the fourth pixel value $q_1$ based on a third offset.

2. The method of claim 1, further comprising: selecting a fifth pixel from the first block, the fifth pixel consecutive to the first and second pixels and located two pixels away from the block boundary and having a fifth pixel value $p_2$;
selecting a sixth pixel from the neighboring block, the sixth pixel consecutive to the third and fourth pixels and located two pixels away from the block boundary and having a sixth pixel value $q_2$;
calculating the second offset based on the first pixel value $p_0$, the second pixel value $p_1$, the fifth pixel value $p_2$, and the first offset; and
calculating the third offset based on the third pixel value $q_0$, the fourth pixel value $q_1$, the sixth pixel value $q_2$, and the first offset.

3. The method of claim 1, wherein when the absolute value of the first offset is less than a first threshold, the calculating the first offset further comprises,
clipping the first offset to be within an interval of -tc and tc by setting the first offset to be equal to -tc if the first offset is smaller than -tc and by setting the first offset to be equal to tc if the first offset is larger than tc, wherein tc is dependent on a quantization parameter value assigned to the respective block.

4. The method of claim 1, wherein the first offset is calculated as an approximation based on $(9*(q_0-p_0)-3*(q_1-p_1))/16$.

5. The method of claim 2,
wherein modifying the second pixel value $p_1$ comprises, adding the second offset to the second pixel value p1, where the second offset is calculated as an approximation based on $(p_0+p_2-2*p_1+2*(\text{first offset}))/4$, and
wherein modifying the fourth pixel value $q_1$ comprises, adding the third offset to the fourth pixel value $q_1$, where the third offset is calculated as an approximation based on $(q_0+q_2-2*q_1-2*(\text{first offset}))/4$.

6. The method of claim 2, wherein: calculating the second offset comprises calculating the second offset to be equal to:
$(((p_2+p_0+1) \gg 1)-p_1+\text{first offset}) \gg 1$, and calculating the third offset comprises calculating the third offset to be equal to:
$(((q_2+q_0+1) \gg 1)-q_1-\text{first offset}) \gg 1$, wherein » denotes a right shift operation.

7. The method of claim 2, wherein,
calculating the second offset comprises clipping the second offset to be within an interval of -tc2 and tc2 by setting the second offset to be equal to -tc2 if the second offset is smaller than -tc2 and by setting the second offset to be equal to tc2 if the second offset is larger than tc2, wherein tc2 is a threshold value that is dependent on a quantization parameter value assigned to the respective block, and
calculating the third offset comprises clipping the third offset within an interval of -tc2 and tc2 by setting the third offset to be equal to -tc2 if the third offset is smaller than -tc2 and by setting the third offset to be equal to tc2 if the third offset is larger than tc2.

8. A decoder comprising a processor and a memory unit, wherein the decoder is configured to:
select two consecutive pixels, comprising a first pixel and a second pixel, from a first block and two consecutive pixels, comprising a third pixel and a fourth pixel, from a neighboring block, the blocks being located on opposite sides of a block boundary and next to the block boundary, and the first, second, third, and fourth pixels forming a line of pixels that is perpendicular to the block boundary,
where the first pixel is located in the first block next to the block boundary and has a first pixel value $p_0$, the second pixel is located in the first block one pixel away from the block boundary and has a second pixel value $p_1$, the third pixel is located in the neighboring block next to the block boundary and has a third pixel value $q_0$, and the fourth pixel is located in the neighboring block one pixel away from the block boundary and has a fourth pixel value $q_1$;
calculate a first offset as a function of the first pixel value $p_0$, the second pixel value $p_1$, the third pixel value $q_0$, and the fourth pixel value $q_1$; and
when an absolute value of the first offset is less than a first threshold:
modify the first pixel value $p_0$ by adding the first offset to the first pixel value po;
modify the third pixel value $q_0$ by subtracting the first offset from the third pixel value $q_0$;
modify the second pixel value $p_1$ based on a second offset; and
modify the fourth pixel value $q_1$ based on a third offset.

9. The decoder of claim 8, wherein the decoder is further configured to:
select a fifth pixel from the first block, the fifth pixel consecutive to the first and second pixels and located two pixels away from the block boundary and having a fifth pixel value $p_2$;

select a sixth pixel from the neighboring block, the sixth pixel consecutive to the third and fourth pixels and located two pixels away from the block boundary and having a sixth pixel value $q_2$;

calculate the second offset based on the first pixel value $p_0$, the second pixel value $p_1$, the fifth pixel value $p_2$, and the first offset; and calculate the third offset based on the third pixel value $q_0$, the fourth pixel value $q_1$, the sixth pixel value $q_2$, and the first offset.

10. The decoder of claim 8, wherein when the absolute value of the first offset is less than a first threshold, the calculating the first offset further comprises:

clipping the first offset to be within an interval of -tc and tc by setting the first offset to be equal to -tc if the first offset is smaller than -tc and by setting the first offset to be equal to tc if the first offset is larger than tc, wherein tc is dependent on a quantization parameter value assigned to the respective block.

11. The decoder of claim 8, wherein the first offset is calculated as an approximation based on $(9*(q_0-p_0)-3*(q_1-p_1))/16$.

12. The decoder of claim 9, wherein the decoder is further configured to:

modify the second pixel value $p_1$ by adding the second offset to the second pixel value p1, where the second offset is calculated as an approximation based on (p0+p2-2*p1+2*(first offset))/4, and modify the second pixel value $p_1$ by adding the third offset to the fourth pixel value q1, where the third offset is calculated as an approximation based on (q0+q2-2*q1-2*(first offset))/4.

13. The decoder of claim 9, wherein the decoder is further configured to: calculate the second offset to be equal to:

$(((p_2+p_0+1)\gg 1)-p_1+\text{first offset})\gg 1$; and calculate the third offset to be equal to:

$(((q_2+q_0+1)\gg 1)-q_1-\text{first offset})\gg 1$, wherein » denotes a right shift operation.

14. The decoder of claim 9, wherein, when calculating the second offset, the decoder is configured to:

clip the second offset to be within an interval of -tc2 and tc2 by setting the second offset to be equal to -tc2 if the second offset is smaller than -tc2 and by setting the second offset to be equal to tc2 if the second offset is larger than tc2, wherein tc2 is a threshold value that is dependent on a quantization parameter value assigned to the respective block, and when calculating the third offset, the decoder is configured to:

clip the third offset within an interval of -tc2 and tc2 by setting the third offset to be equal to -tc2 if the third offset is smaller than -tc2 and by setting the third offset to be equal to tc2 if the third offset is larger than tc2.

15. A non-transitory computer-readable medium comprising instructions which, when executed by a processor, perform:

selecting two consecutive pixels, comprising a first pixel and a second pixel, from a first block and two consecutive pixels, comprising a third pixel and a fourth pixel, from a neighboring block, the blocks being located on opposite sides of a block boundary and next to the block boundary, and the first, second, third, and fourth pixels forming a line of pixels that is perpendicular to the block boundary, where the first pixel is located in the first block next to the block boundary and has a first pixel value $p_0$, the second pixel is located in the first block one pixel away from the block boundary and has a second pixel value $p_1$, the third pixel is located in the neighboring block next to the block boundary and has a third pixel value $q_0$, and the fourth pixel is located in the neighboring block one pixel away from the block boundary and has a fourth pixel value $q_1$;

calculating a first offset as a function of the first pixel value $p_0$, the second pixel value $p_1$, the third pixel value $q_0$, and the fourth pixel value $q_1$; and when an absolute value of the first offset is less than a first threshold:

modifying the first pixel value $p_0$ by adding the first offset to the first pixel value $p_0$;

modifying the third pixel value $q_0$ by subtracting the first offset from the third pixel value $q_0$;

modifying the second pixel value $p_1$ based on a second offset; and modifying the fourth pixel value $q_1$ based on a third offset.

16. The non-transitory computer-readable medium of claim 15, further comprising instructions, which when executed by the processor, perform:

selecting a fifth pixel from the first block, the fifth pixel consecutive to the first and second pixels and located two pixels away from the block boundary and having a fifth pixel value p2;

selecting a sixth pixel from the neighboring block, the sixth pixel consecutive to the third and fourth pixels and located two pixels away from the block boundary and having a sixth pixel value q2;

calculating the second offset based on the first pixel value p0, the second pixel value p1, the fifth pixel value p2, and the first offset; and calculating the third offset based on the third pixel value q0, the fourth pixel value q1, the sixth pixel value q2, and the first offset.

17. The non-transitory computer-readable medium of claim 15, wherein when the absolute value of the first offset is less than a first threshold, the calculating the first offset further comprises, clipping the first offset to be within an interval of -tc and tc by setting the first offset to be equal to -tc if the first offset is smaller than -tc and by setting the first offset to be equal to tc if the first offset is larger than tc, wherein tc is dependent on a quantization parameter value assigned to the respective block.

18. The non-transitory computer-readable medium of claim 15, wherein the first offset is calculated as an approximation based on $(9*(q_0-p_0)-3*(q_1-p_1))/16$.

19. The non-transitory computer-readable medium of claim 16, wherein modifying the second pixel value $p_1$ comprises, adding the second offset to the second pixel value p1, where the second offset is calculated as an approximation based on $(p_0+p_2-2*p_1+2*(\text{first offset}))/4$, and wherein modifying the second pixel value $p_1$ comprises, adding the third offset to the fourth pixel value q1, where the third offset is calculated as an approximation based on $(q_0+q_2-2*q_1-2*(\text{first offset}))/4$.

20. The non-transitory computer-readable medium of claim 16, wherein:

calculating the second offset comprises calculating the second offset to be equal to:

$(((p_2+p_0+1) \gg 1)-p_1+\text{first offset}) \gg 1$, and calculating the third offset comprises calculating the third offset to be equal to:

$(((q_2+q_0+1) \gg 1)-q_1-\text{first offset}) \gg 1$, wherein $\gg$ denotes a right shift operation.

21. The non-transitory computer-readable medium of claim 16, wherein, calculating the second offset comprises clipping the second offset to be within an interval of -tc2 and tc2 by setting the second offset to be equal to -tc2 if the second offset is smaller than -tc2 and by setting the second offset to be equal to tc2 if the second offset is larger than tc2, wherein tc2 is a threshold value that is dependent on a quantization parameter value assigned to the respective block, and calculating the third offset comprises clipping the third offset within an interval of -tc2 and tc2 by setting the third offset to be equal to -tc2 if the third offset is smaller than -tc2 and by setting the third offset to be equal to t2 if the third offset is larger than tc2.

* * * * *